United States Patent
Lie et al.

(10) Patent No.: US 11,200,158 B1
(45) Date of Patent: Dec. 14, 2021

(54) METHODS, DEVICES, AND MEDIA FOR HARDWARE-SUPPORTED OBJECT METADATA RETRIEVAL

(71) Applicant: The Governing Council of the University of Toronto, Toronto (CA)

(72) Inventors: David Lie, North York (CA); Shengjie Xu, Toronto (CA); Wei Huang, Toronto (CA)

(73) Assignees: The Governing Council of the University of Toronto, Toronto (CA); Huawei Technologies Canada Co., Ltd., Markham (CA)

(*) Notice: Subject to any disclaimer, the term of this patent is extended or adjusted under 35 U.S.C. 154(b) by 0 days.

(21) Appl. No.: 16/890,772

(22) Filed: Jun. 2, 2020

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 12/02* | (2006.01) | |
| *G06F 9/50* | (2006.01) | |
| *G06F 8/41* | (2018.01) | |
| *G06F 12/0891* | (2016.01) | |
| *G06F 16/14* | (2019.01) | |

(52) U.S. Cl.
CPC .......... *G06F 12/0207* (2013.01); *G06F 8/434* (2013.01); *G06F 9/5016* (2013.01); *G06F 12/0292* (2013.01); *G06F 12/0891* (2013.01); *G06F 16/14* (2019.01); *G06F 2205/106* (2013.01); *G06F 2212/7207* (2013.01)

(58) Field of Classification Search
CPC . G06F 12/0292; G06F 2205/106; G06F 16/14
USPC ........................................................ 711/154
See application file for complete search history.

(56) References Cited

U.S. PATENT DOCUMENTS

| | | | |
|---|---|---|---|
| 2008/0022054 A1* | 1/2008 | Hertzberg | G06F 9/524 |
| | | | 711/152 |
| 2016/0147466 A1 | 5/2016 | Yazdani et al. | |
| 2016/0171025 A1* | 6/2016 | Ji | G06F 16/235 |
| | | | 707/747 |
| 2016/0364171 A1* | 12/2016 | Frank | G06F 3/0613 |
| 2018/0247057 A1 | 8/2018 | Melski et al. | |
| 2019/0121716 A1 | 4/2019 | Kurmus et al. | |
| 2020/0159888 A1 | 5/2020 | Ghose | |

OTHER PUBLICATIONS

Myoung Jin Nam et al.; "FRAMER: A Tagged-Pointer Capability System with Memory Safey Application"; pp. 612-626 Dec. 2019.

(Continued)

*Primary Examiner* — Edward J Dudek, Jr.
*Assistant Examiner* — Sidney Li

(57) ABSTRACT

Methods and devices for hardware-supported schemes for efficient metadata retrieval are described. The schemes may use hardware to efficiently enforce type safety and speed up memory bound checks without imposing undue memory overhead. Multiple such schemes may be supported by a device, permitting the selection of an optimal scheme based on a given memory allocation request. The schemes may be compatible with legacy code and applicable to a wide range of data objects and system constraints. Compilation, instrumentation, and linking of code to effect such schemes is also described.

20 Claims, 11 Drawing Sheets

(56) References Cited

OTHER PUBLICATIONS

Nathan Burow et al.; "CUP: Comprehensive User-Spaces Protection for C/C++" Jun. 2018.
Krishnakumar, et al.; "ALEXIA: A Processor with Lightweigh Extensions for Memory Safety"; ACM Tranaction on Embedded Computing Systems; vol. 18, Nov. 6, Article 122 Nov. 2019.

\* cited by examiner

METHODS, DEVICES, AND MEDIA FOR HARDWARE-SUPPORTED OBJECT METADATA RETRIEVAL

FIELD

The present disclosure is related to methods and devices for memory safety, and in particular to methods and devices for object metadata retrieval for performing memory bound checks.

BACKGROUND

Memory corruption vulnerabilities can allow an attacker to compromise the security of a computing system. Software programs running on a computing system operate on data objects in memory (also called "memory objects" or simply "objects" herein) based on assumptions about the data type of the object being operated upon; techniques to ensure that these assumptions are correct are referred to as "type safety". Memory corruption vulnerabilities are the result of a software defect which allows an attacker to provide an input which causes a software program to write to the memory of the computing system in a way that violates type safety.

Software programs (also called "programs" herein) locate objects in memory using references called pointers. A pointer typically identifies the type of the object to which they point, and includes a memory address used by the program to locate the object in memory. One way to mitigate memory corruption vulnerabilities is to perform checks whenever the program accesses memory to ensure that the access conforms to type safety rules—i.e., that the type of the pointer used by the program matches the type of the object being accessed. A program that is type safe will never corrupt an object or a pointer to an object, thus preventing all memory corruption vulnerabilities.

Memory-safety checks typically involve checking a pointer against object metadata before the pointer is de-referenced. Typically this involves a memory bound check or memory range check to ensure that the pointer still points to a valid memory region, and that the type of the pointer and the type of the memory region correspond. To perform these checks, a scheme for retrieving the type of the object that a pointer points to must exist, and the scheme should be efficient. The size and type of the object is often encoded in a data object called object metadata, which is immutable over the lifetime of the object.

Techniques have been developed to perform these checks in software, but such checks can be very slow when implemented in software.

More recently, techniques have been developed to perform hardware-based memory access checks (i.e. memory bound checks or memory range checks). Three related techniques are ARM's Pointer Authentication Code (PAC), ARM's Memory Tagging Extensions (MTE), and Intel's Memory Protection Extensions (MPX). Each of these techniques exhibits drawbacks. PAC only checks the integrity of pointers by including a message authentication code (MAC)—a signed hash of the pointer value—in the so-called "low-fat" unused upper bits of the pointer. Thus, it cannot verify type safety. MTE extends this to include a shadow memory that also tags each 16 byte memory chunk and each pointer, and ensures that the tag on the pointer matches the tag on the memory. However, the 16 byte granularity cannot handle tightly packed structures, and the shadow memory overhead scales with both the size of physical memory and the cache. Finally, MPX uses a tree structure to store memory types instead of shadow memory. This is more space-efficient, but introduces more overhead when accessing the tags.

None of these three techniques modifies the size of pointers. This is in contrast to fat-pointer techniques, such as Capability Hardware Enhanced RISC Instructions (CHERI), which modify the size of pointers. Modifying the size of pointers leads to incompatibility between instrumented code and legacy code, and can also break code that makes assumptions about the size of pointers.

Thus, there is a need for a memory protection technique which overcomes one or more of the above-noted disadvantages of existing techniques.

SUMMARY

In various embodiments described herein, methods and devices are disclosed that provide hardware-supported schemes for efficient metadata retrieval.

Various embodiments may enable hardware-supported schemes for efficient metadata retrieval that speed up memory bound checks without imposing undue memory overhead. Various embodiments may enforce type safety and perform memory bound checks using hardware to retrieve object metadata efficiently, while being compatible with legacy code and being applicable to a wide range of data objects and system constraints.

In some aspects, the present disclosure describes a device comprising a metadata retrieval hardware module, a processor device, and a memory. The memory contains instructions that, when executed by the processor device, operate a software module to provide a pointer to the metadata retrieval hardware module. The pointer comprises address data encoding an object location, the object location indicating a location within an object stored in the memory, and on-pointer metadata. The metadata retrieval hardware module is configured to use the on-pointer metadata to identify a pointer type of the pointer from a plurality of pointer types, the plurality of pointer types comprising an object-relative pointer type, and a second pointer type. The metadata retrieval hardware module is configured to calculate the metadata location of a pointer of the object-relative pointer type by: decoding a metadata offset from the on-pointer metadata of the pointer, and adding the metadata offset to the object location to calculate the metadata location. The metadata retrieval hardware module is configured to calculate the metadata location of a pointer of the second pointer type by determining a base location different from the object location, and adding an offset amount, calculated based on the on-pointer metadata, to the base location to calculate the metadata location. The metadata retrieval hardware module is configured to retrieve object metadata from the metadata location, and provide the object metadata to the software module.

In some aspects, the present disclosure describes a method. A software module is used to provide a pointer to a metadata retrieval hardware module. The pointer comprises address data encoding an object location, the object location indicating a location within an object stored in a memory, and on-pointer metadata. The metadata retrieval hardware module is used to use the on-pointer metadata to identify a pointer type of the pointer from a plurality of pointer types, the plurality of pointer types comprising an object-relative pointer type and a second pointer type. In the object-relative pointer type, the on-pointer metadata encodes a metadata offset, and a metadata location is offset from the object location by the metadata offset. In the second pointer type, a metadata location is offset from a base location by an offset amount calculated based on the on-pointer metadata. The metadata location is calculated based at least in part on the pointer type of the pointer. Object metadata is retrieved from the metadata location, and the object metadata is provided to the software module.

In some examples, the metadata retrieval hardware module comprises a module of the processor device in communication with a load-store unit of the processor device.

In some examples, the device further comprises a bound checking hardware module. The instructions, when executed by the processor device, further operate the software module to provide the pointer and the memory object metadata to the bound checking hardware module. The bound checking hardware module is configured to perform a memory bound check based on the pointer and the memory object metadata, thereby generating a bound check result, and return the bound check result to the software module.

In some examples, the bound checking hardware module is further configured to invalidate the pointer in response to generating an out-of-bounds bound check result.

In some examples, the bound checking hardware module comprises a module of the processor device in communication with a load-store unit of the processor device.

In some examples, the metadata retrieval hardware module is further configured to calculate the metadata location of a pointer of the object-relative pointer type. The object location is determined by decoding a first bit sequence of the address data. The metadata offset is determined by decoding a second bit sequence of the on-pointer metadata. The metadata offset is added to the object location to calculate the metadata location.

In some examples, the instructions, when executed by the processor device, further cause the device to carry out additional steps. A data object is identified as failing to satisfy a placement-constraint metric and satisfying a size-constraint metric. An object memory space is allocated for storing the data object in the memory, the object memory space being located at an object base address. A metadata memory space is allocated for storing the memory object metadata in the memory, the metadata memory space being located at the metadata location. The pointer is generated by setting the object location to the value of the object base address, and setting the metadata offset to a difference between the metadata location and the object location.

In some examples, the second pointer type is a subheap pointer type. The metadata retrieval hardware module is configured to calculate the metadata location of a pointer of the subheap pointer type by determining the base location by decoding a first bit sequence of the address data, the base location comprising a subheap location, determining the offset amount, the offset amount comprising a metadata offset, and adding the subheap metadata offset to the subheap location to calculate the metadata location.

In some examples, the instructions, when executed by the processor device, further cause the device to carry out additional steps. A subheap is allocated in the memory located at the subheap location. The object metadata is stored within the subheap at the metadata location, the object metadata comprising object type metadata indicating an object type for objects stored in the subheap. A data object is identified as being of the object type and satisfying a placement-constraint metric. An object memory space is allocated for storing the data object, the object memory space being located at an object base address within the subheap, the object base address being offset from the subheap location by the object offset. The pointer is generated by encoding the subheap location as a first bit sequence of the address data, setting an object offset to a difference between the object base address and the subheap location, and encoding the object offset as a second bit sequence of the address data.

In some examples, the second pointer type is a global table pointer type. The metadata retrieval hardware module is configured to calculate the metadata location of a pointer of the global table pointer type. The offset amount is determined by decoding a second bit sequence of the on-pointer metadata encoding a global table index value, and calculating the offset amount based on the global table index value, the offset amount comprising a global table offset amount. The base location is retrieved, the base location comprising a global table base location. The global table offset amount is added to the global table base location to calculate the metadata location.

In some examples, the instructions, when executed by the processor device, further cause the device to carry out additional steps. A data object is identified as failing to satisfy a placement-constraint metric and failing to satisfy a size-constraint metric. An object memory space is allocated for storing the data object in the memory, the object memory space being located at an object base address. A metadata memory space is allocated for storing the object metadata in the memory, the metadata memory space being located at the metadata location. The object metadata is stored within the global table at the metadata location. The pointer is generated by setting the object location to the value of the object base address, and setting the global table index value to a value corresponding to the global table offset amount.

In some examples, the second pointer type is a subheap pointer type. The plurality of pointer types further comprises a global table pointer type. The metadata retrieval hardware module is configured to carry out additional steps. The metadata location of a pointer of the object-relative pointer is calculated type by determining the object location by decoding a first bit sequence of the address data, determining the metadata offset by decoding a second bit sequence of the on-pointer metadata, and adding the metadata offset to the object location to calculate the metadata location. The metadata location of a pointer of the subheap pointer type is calculated by determining the base location by decoding a first bit sequence of the address data, the base location comprising a subheap location, determining the offset amount by decoding a third bit sequence of the on-pointer metadata, the offset amount comprising a metadata offset, and adding the metadata offset to the subheap location to calculate the metadata location. The metadata location of a pointer of the global table pointer type is calculated by determining the offset amount by decoding a second bit sequence of the on-pointer metadata encoding a global table index value, and calculating the offset amount based on the global table index value, the offset amount comprising a global table offset amount; retrieving the base location, the base location comprising a global table base location; and adding the global table offset amount to the global table base location to calculate the metadata location.

In some aspects, the present disclosure describes a computer-readable medium having instructions tangibly stored thereon. The instructions, when executed by a processing unit, cause the processing unit to operate the software module as described above.

In some aspects, the present disclosure describes a computer-readable medium having instructions tangibly stored thereon. The instructions, when executed by a processing unit, cause the processing unit to operate the compiler as described above.

In some aspects, the present disclosure describes a computer-readable medium having instructions tangibly stored thereon. The instructions, when executed by a processing unit, cause the processing unit to operate the memory allocator as described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and apparatuses are described that help to enable memory protection. Type safety may be enforced, and bound checks carried out, using hardware modules configured to support one or more memory allocation schemes. Compilation, instrumentation, and linking of software code to effect such schemes is also described.

The example embodiments described herein may refer to one or more "software modules" and/or "hardware modules". As used herein, the term "software module" may refer to any set of software or firmware instructions executable by a processor, controller, or other computing hardware to carry out the operations described herein. In particular, the term "software module" may be used herein to refer to any executable software that has been compiled and instrumented by a compiler to include instructions for performing the methods and operations described herein. Thus, the "software module" may be any piece of compiled object code that, regardless of its primary purpose, has been instrumented with code (i.e. executable instructions) that implements the memory protection operations described herein. It will be appreciated that, in some embodiments, a computing environment implementing the memory protection methods and operations described herein may be configured to only execute software that has been compiled in accordance with the techniques described herein, such that every piece of software running in the computing environment (including system software, application software, and so on) carries out the memory protection operations of a "software module" as described herein.

The term "hardware module" as used herein may refer to electronic hardware, or a combination of electronic hardware and firmware, configured to carry out the memory protection operations described herein. In particular, a "metadata retrieval hardware module" and a "bound checking hardware module" may be used to carry out various memory protection operations as described herein. As further described below with reference to FIGS. 1, 10, and 11, the metadata retrieval hardware module and bound checking hardware module may be implemented as components or capabilities of a processor core in some embodiments.

Example Device

Figure 1:
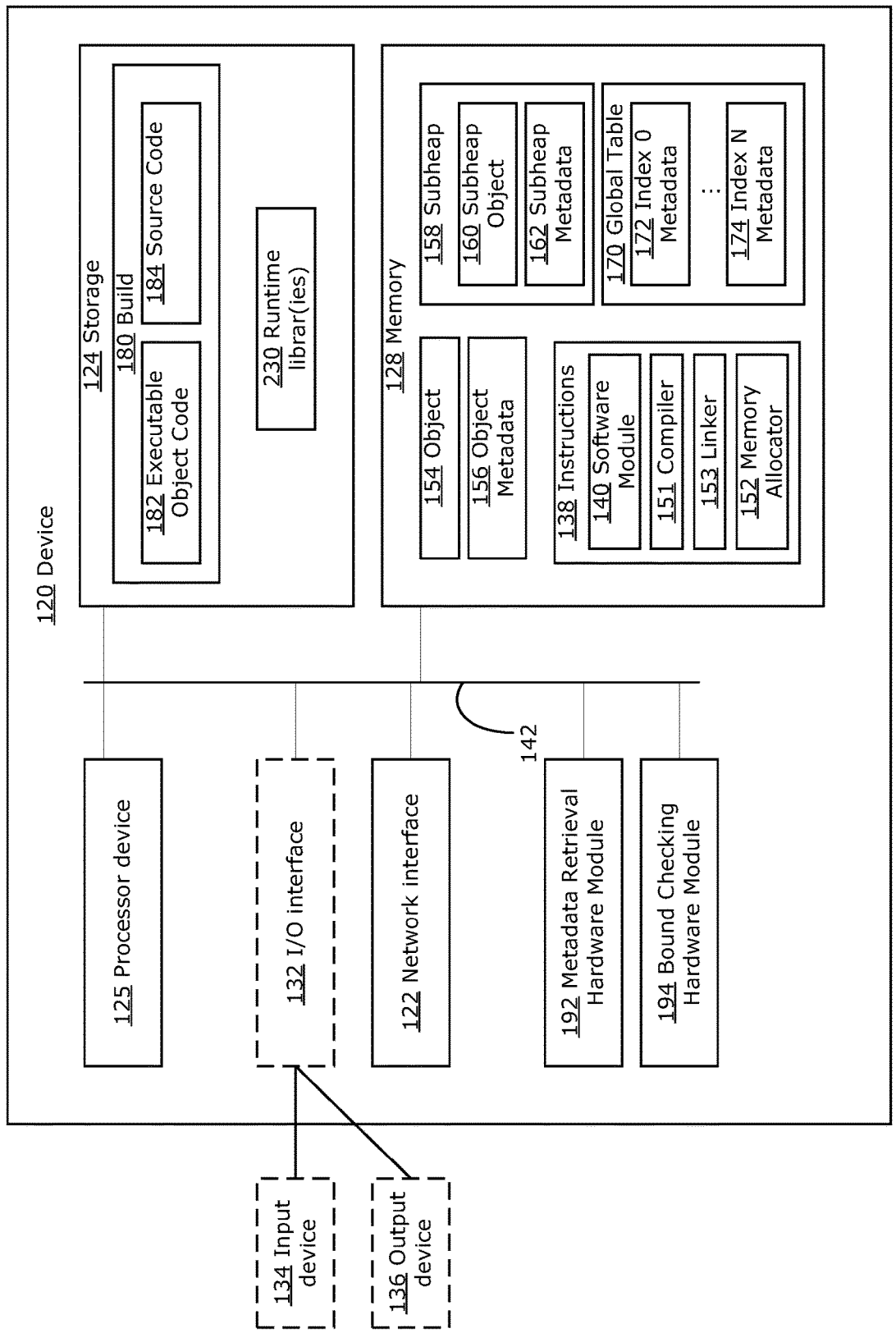
FIG. 1 is a block diagram illustrating an example simplified device in which examples disclosed herein may be implemented.

To assist in understanding the present disclosure, FIG. 1 is first discussed.

Figure 2:
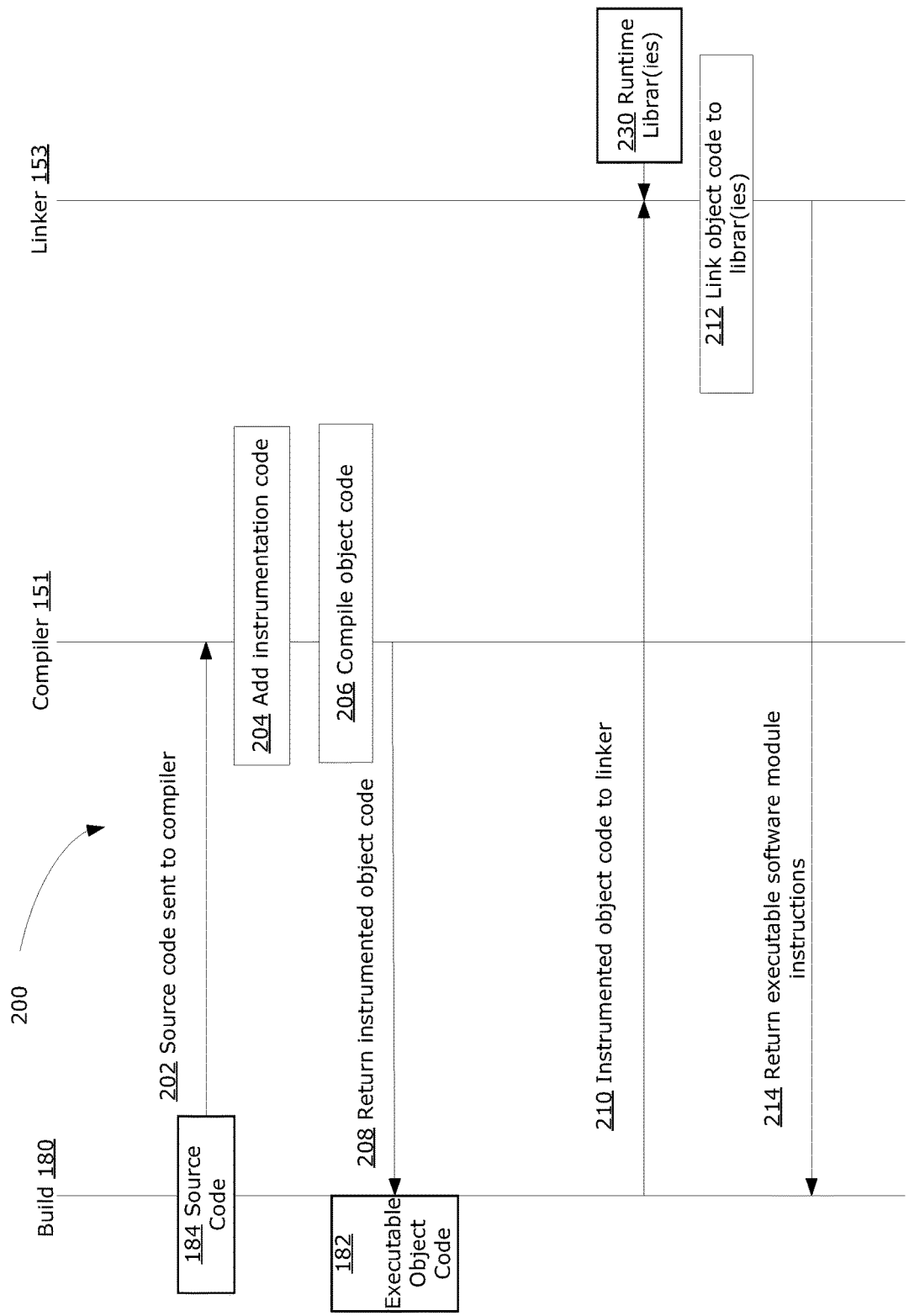
FIG. 2 is a signaling diagram representing an example method of compilation and linking to instrument memory protection using hardware-supported metadata retrieval, in accordance with examples described herein.

FIG. 1 is a block diagram illustrating a simplified example of a device 120, such as a computer. Other examples suitable for implementing embodiments described in the present disclosure may be used, which may include components different from those discussed below. Although FIG. 2 shows a single instance of each component, there may be multiple instances of each component in the device 120.

The device 120 may include one or more processor devices 125, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The device 120 may also include one or more optional input/output (I/O) interfaces 132, which may enable interfacing with one or more optional input devices 134 and/or optional output devices 136.

In the example shown, the input device(s) 134 (e.g., a keyboard, a mouse, a microphone, a touchscreen, and/or a keypad) and output device(s) 136 (e.g., a display, a speaker and/or a printer) are shown as optional and external to the device 120. In other examples, there may not be any input device(s) 134 and output device(s) 136, in which case the I/O interface(s) 132 may not be needed.

The device 120 may include one or more network interfaces 122 for wired or wireless communication with the network 105, the receiver device 150, or other entity or node in the system 100. The network interface(s) 122 may include wired links (e.g., Ethernet cable) and/or wireless links (e.g., one or more antennas) for intra-network and/or inter-network communications.

The device 120 may also include one or more storage units 124, which may include a mass storage unit such as a solid state drive, a hard disk drive, a magnetic disk drive and/or an optical disk drive. The storage unit(s) 124 may store a build 180 of an executable program for operating a software module. The build 180 may include source code 184, which may be compiled to generate executable object code 182, which is also stored in the build 180.

The device 120 may include one or more memories 128, which may include a volatile or non-volatile memory (e.g., a flash memory, a random access memory (RAM), and/or a read-only memory (ROM)). The non-transitory memory(ies) 128 may store instructions for execution by the processor device(s) 125, such as to carry out examples described in the present disclosure. The memory(ies) 128 may include other software instructions 138, such as for implementing an operating system and other applications/functions. In some examples, the memory(ies) 128 may include software instructions 138 for execution by the processor device 125 to implement a software module 140, as described further below. The software module 140 may be loaded into the memory(ies) 128 by executing the executable object code 182 using the processor device 125, and optionally linking the executable object code 182 against one or more runtime libraries 230 stored in storage 124. The software module 140 is used in the embodiments described herein to illustrate how any software may be compiled, instrumented, and/or linked to facilitate the memory protection features described herein. Thus, a given device 120 may include any number of software modules 140, each performing a different function, but each being configured to carry out the memory protection steps described herein.

The instructions 138 may also include a compiler 151 used to compile and instrument the source code 184 to generate instrumented object code, a linker 153 for linking the instrumented object code to the runtime libraries 230, and a memory allocator 152 for allocating objects and associated metadata, all of which are described in detail below. Some embodiments may include multiple memory allocators, including a legacy memory allocator and a heap memory allocator as described in detail below.

The memory(ies) 128 may further include various data objects and associated metadata. These may include an object 154 (i.e. a data object stored in memory), object metadata 156 associated with the object 154, a subheap 158 including subheap metadata 162 and a subheap object 160, and a global table 170 including a plurality of indexed metadata entries shown as Index 0 metadata 172 through Index N metadata 174. These are all described in detail below.

In some examples, the device 120 may additionally or alternatively execute instructions from an external memory (e.g., an external drive in wired or wireless communication with the device 120) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The device 120 may include a metadata retrieval hardware module 192 for retrieving object metadata from the memory(ies) 128, as described in detail below. The metadata retrieval hardware module 192 may be implemented as a component of the memory(ies) 128, the processor device 125, or another component of the device 120 in various embodiments.

The device 120 may include a bound checking hardware module 194 for performing memory bound checks, as described in detail below. The bound checking hardware module 194 may be implemented as a component of the memory(ies) 128, the processor device 125, or another component of the device 120 in various embodiments.

The device 120 may also include a bus 142 providing communication among components of the device 120, including those components discussed above. The bus 142 may be any suitable bus architecture including, for example, a memory bus, a peripheral bus or a video bus.

While the device 120 is shown as including components necessary to compile, instrument, and link the source code 184 as well as the components necessary to operate the software module 140, it will be appreciated that the various components of the build 180 and the tools necessary to create the executable object code 182 (e.g., the compiler 151 and linker 153) could be located on a separate device, with the executable object code 182 installed in the device 120 for operation of the software module 140. More generally, it will be appreciated that various components and operations described herein can be implemented on multiple separate devices in some embodiments.

Compilation, Instrumentation, and Linking

FIG. 2 is a signaling diagram illustrating an example method 200 of generating the software module 140. The compiler 151 instruments the code required to effect memory protection according to methods described herein. The linker 153 is optionally used to link the instrumented object code to the runtime libraries 230.

The method begins with the source code 184 stored in the build 180. At 202, the source code 184 is sent to the compiler 151 for compilation. At 204, the compiler 151 adds instrumentation code to effect the memory protection features and operations described in greater detail below. This step 204 may be performed by generating an intermediate representation (IR) of the source code to which instrumentation code may be added. In some examples, additional instrumentation code may be added after compilation step 206 below. At 206, the compiler 151 compiles the source code 184 into object code, e.g., by optimizing and transforming the instrumented IR and converting it to object code. At 208, the compiled and instrumented object code is returned to the build 180 in storage 124 as the executable object code 182.

At runtime, the executable object code 182 is loaded into the memory 128. At 210, the executable object code 182 may also be sent to a linker 153. At 212, the linker 153 links the executable object code 182 against one or more runtime libraries 230 stored in storage 124, loading the linked parts of those libraries into the memory 128 as well. At 214, the linked executable instructions are returned to memory 128 as the instructions 138 for operating the software module 140.

The software module 140 is then loaded into memory 128 and ready for carrying out various steps of the methods described below.

Runtime Memory Protection

Figure 3:
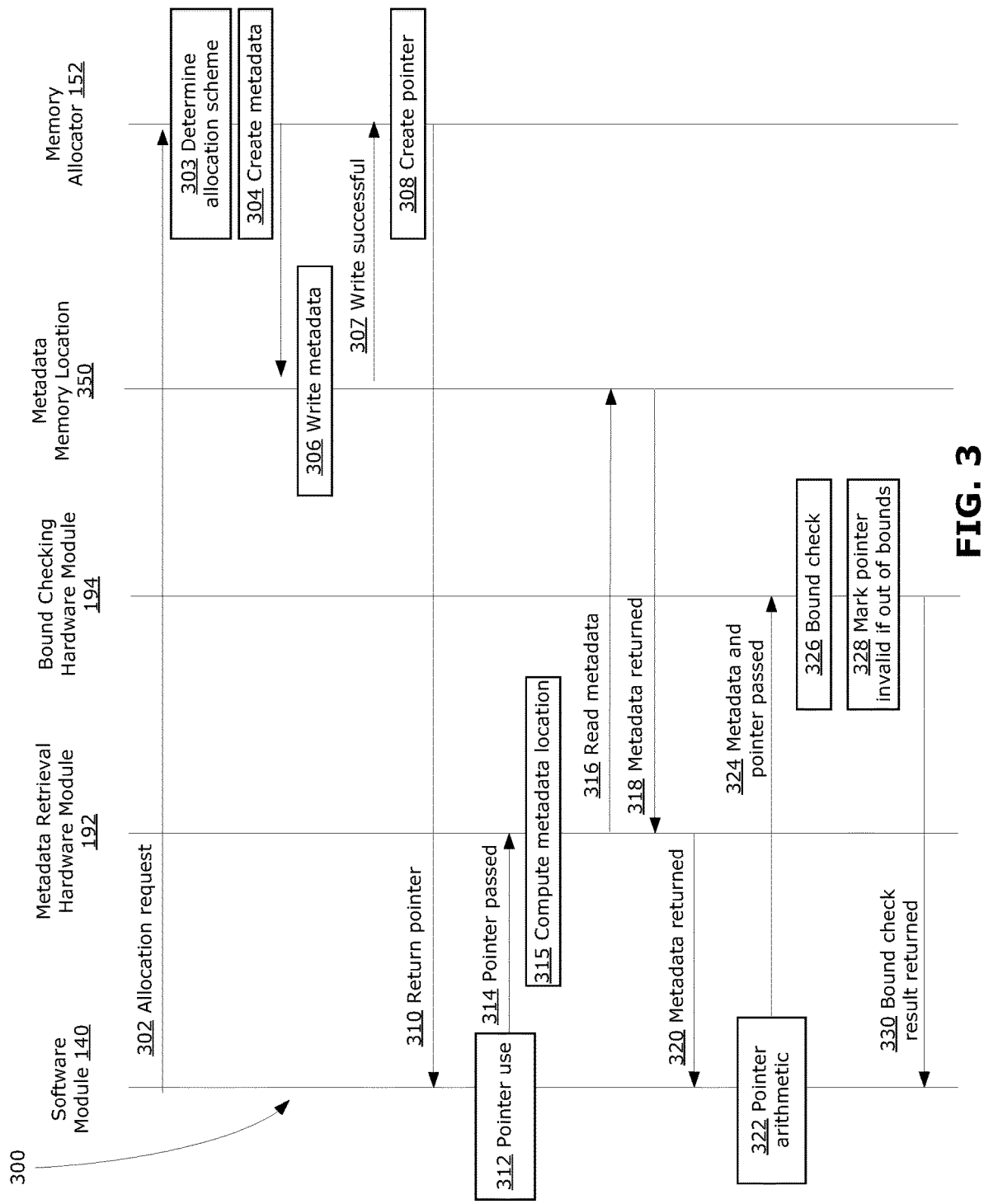
FIG. 3 is a signaling diagram representing an example method of memory protection at runtime using the hardware-supported metadata retrieval, in accordance with examples described herein.

FIG. 3 is a signaling diagram illustrating an example method 300 of memory protection at runtime using the hardware-supported metadata retrieval. The method 300 is carried after the software module 140 has been loaded into memory 128, for example by method 200 described above with reference to FIG. 2. When objects are allocated, the memory allocator 152 labels the object with metadata and makes this available to the hardware for fast retrieval at runtime. The compiler 151 indicates to the hardware when to perform the checks. At runtime, the hardware of the device 120 uses the metadata to check the validity of a pointer. Each time the program loads a pointer from memory for operations, the metadata is retrieved. Then, whenever pointer arithmetic is performed that modifies the pointer, the result of the pointer arithmetic is checked against the metadata. If the pointer is invalid, it is marked as invalid; dereferencing an invalid pointer will result in an exception.

At 302, the software module 140 makes a memory allocation request. This may be initiated as the result of, e.g., a variable being declared in the instructions of the software module 140. The memory allocation request may in some embodiments indicate the type of data object to be stored in the allocated memory space, e.g., the type of the declared variable.

In some embodiments, the memory allocator 152 is a software module comprising instructions stored in memory 128 and executed by the processor device 125. At 303, the memory allocator 152 determines a memory allocation scheme to use to satisfy the memory allocation request. A memory space is allocated for the data object at an object location of the memory 128, according to the memory allocation scheme selected by the memory allocator 152. In some embodiments, the memory allocation scheme is selected by the memory allocator 152 based at least in part on the type of the data object to occupy the allocated memory space. In some embodiments, the memory allocation scheme is selected by the memory allocator based at least in part on other constraints of the device 120 or the software running on the device 120. Example memory allocation schemes will be described in greater detail below, as well as criteria for selecting among different such schemes.

At 304, the memory allocator generates object metadata associated with the data object. In some embodiments, the object metadata indicates the type of the data object, which in some embodiments will indicate the size of the data object (i.e. the amount of space it occupies in memory 128). In some embodiments, the object metadata may indicate other characteristics associated with the data object.

At 306, the memory allocator 152 writes the object metadata to memory 128 at a metadata memory location determined with reference to the memory allocation scheme selected by the memory allocator 152 at step 303.

At 307, the memory allocator 152 confirms that the metadata memory write step 306 was successful. At 308, after the object has had a memory space allocated for it at the object location, and after the object metadata has been written to the metadata location, the memory allocator 152 generates a pointer encoding the object location and metadata location according to the memory allocation scheme selected at step 303.

At 310, the pointer generated at step 308 is returned to the software module 140. The pointer may be used in operation of the software module 140 to read and write values of the data object to its allocated memory space at the object location. The pointer may also be used to perform memory safety features described below.

At 312, the software module 140 attempts to use the pointer, for example to write data to the data object in memory or read data from the data object in memory. In response, at 314, instrumentation code added to the executable object code 182 by the compiler 151 is executed to pass the pointer to the metadata retrieval hardware module 192. At 315, the metadata retrieval hardware module 192 uses the pointer to compute the metadata location based on the contents and memory allocation scheme of the pointer. At 316, the metadata retrieval hardware module 192 requests the object metadata from the metadata location in memory. At 318, the memory 128 returns the object metadata to the metadata retrieval hardware module 192. At 320, the metadata retrieval hardware module 192 returns the object metadata to the software module 140. The retrieved object metadata may be checked by the software module 140 to confirm type safety before using the pointer.

At 322, the software module 140 performs pointer arithmetic to modify the object location pointed to by the pointer. In response, at 324, instrumentation code added to the executable object code 182 by the compiler 151 is executed to pass the pointer and the retrieved object metadata to the bound checking hardware module 194. At 326, the bound checking hardware module 194 performs a memory bound check using the pointer and the object metadata. In some embodiments, the memory bound check may use the data type of the data object indicated in the object metadata, as well as the object location indicated by the pointer, to determine whether the pointer arithmetic result (i.e. the new object location of the pointer) points to a memory location within the allocated space for the data object.

In some embodiments, the bound check may return a positive or valid result (meaning that the pointer arithmetic result points to a valid location within the bounds of the data object's allocated memory space) or a negative or invalid result (meaning that the pointer arithmetic result points to an invalid location outside the bounds of the data object's allocated memory space).

If the result of the bound check is negative, at 328 the bound checking hardware module 194 invalidates the pointer. In some embodiments, invalidation of the pointer may be performed by software, such as the software module 140, after the result of the bound check is returned (at step 330 below).

At 330, the result of the bound check is returned to the software module 140. If the result of the bound check is positive, the software module 140 may perform the intended memory operations on the memory location indicated by the pointer arithmetic result.

By carrying out the steps of method 300, memory protection may be provided in some embodiments that allows for efficient, hardware-based metadata retrieval and bound checking. In some embodiments, the functions of one or both of the metadata retrieval hardware module 192 or bound checking hardware module 194 may be implemented in software, although this would potentially sacrifice some of the efficiency and/or security gains of using hardware.

Instrumentation of Software

Figure 4:
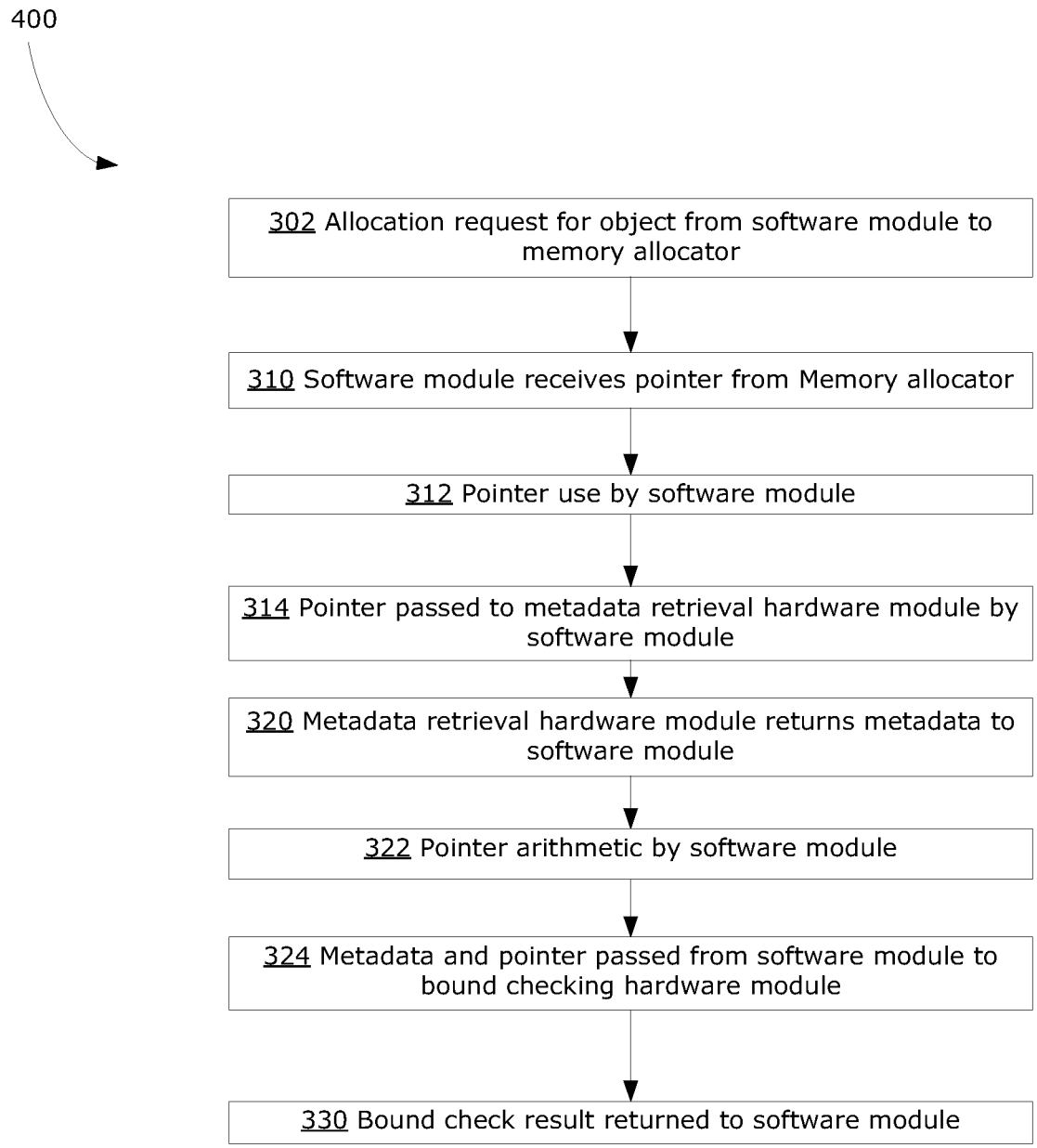
FIG. 4 is a flowchart illustrating the steps of an example method for memory protection including instrumented pointer use by a software module, in accordance with examples described herein.

FIG. 4 is a flowchart illustrating the steps of an example method 400 for memory protection, including instrumented pointer use by the software module 140. Method 400 illustrates the steps of method 300 performed using the software module 140, namely steps 302, 310, 312, 314, 320, 322, 324, and 330. These steps may be performed by instrumentation code instrumentation code added to the executable object code 182 by the compiler 151, e.g., using method 200. Each of the illustrated steps is performed as described above with reference to method 300 of FIG. 3.

Memory Allocation Schemes

Various example memory allocation schemes used by the memory allocator 152 will now be described, along with their associated pointer structures and methods for determining a metadata location associated with said pointers. Some embodiment may maximize efficiency by supporting multiple memory allocation schemes for use in different circumstances, e.g., based on the object type and/or the constraints of the device 120. Three memory allocation schemes are described below—an Object-relative Scheme, a Subheap Scheme, and a Global Table Scheme—along with criteria and methods for selecting which scheme should be used for a given object type or in a given circumstance. Each memory allocation scheme generates a corresponding pointer type, such as an object-relative pointer, a subheap pointer, or a global table pointer.

In each example memory allocation scheme described below, some number of bits n in the upper part of an address pointer are not used for addressing memory and may therefore be available for other uses. Each scheme described below uses these n bits to encode metadata information about the pointer. In an example embodiment, the memory allocator uses the first 2 bits (referred to as a pointer-type bit sequence) to encode the pointer type of the pointer indicating the memory allocation scheme used for that pointer (e.g., Object-relative, Subheap or Global Table), leaving the remaining (n-2) bits to be used by the scheme. The (n-2) bits used by a memory allocation scheme are referred to herein as the "on-pointer metadata" for that scheme (the 2-bit pointer-type bit sequence may also be referred to as part of the on-pointer metadata). Each described scheme may efficiently retrieve object metadata, wherein the metadata includes the bounds that define the memory range that the pointer (or any derived pointer) can point to, assuming that the pointer points to an array or a composite data type (e.g., a struct or record). Because each scheme stores the on-pointer metadata in the upper unused bits of the pointer representation (e.g., a 64-bit pointer representation), they do not alter the size of pointers. This enables each, or all, of the schemes used below to be used on the same device 120 as legacy code using conventional 64-bit pointers.

Object-Relative Memory Allocation Scheme

A first example memory allocation scheme as used by example embodiments described herein is referred to as an Object-relative scheme. The Object-relative scheme extends the layout of an object in memory with the object's associated object metadata. The object metadata is usually stored at the end of the object, but can be stored at any offset relative to the object. The offset from the current pointer address (i.e. the object location) to the metadata address (i.e. the metadata location) is stored as on-pointer metadata and is referred to as the "metadata offset". When the hardware reads the metadata, it adds the object location stored on the pointer to the metadata offset from the on-pointer metadata, then loads the metadata from the computed address (i.e. the metadata location).

Figure 5:
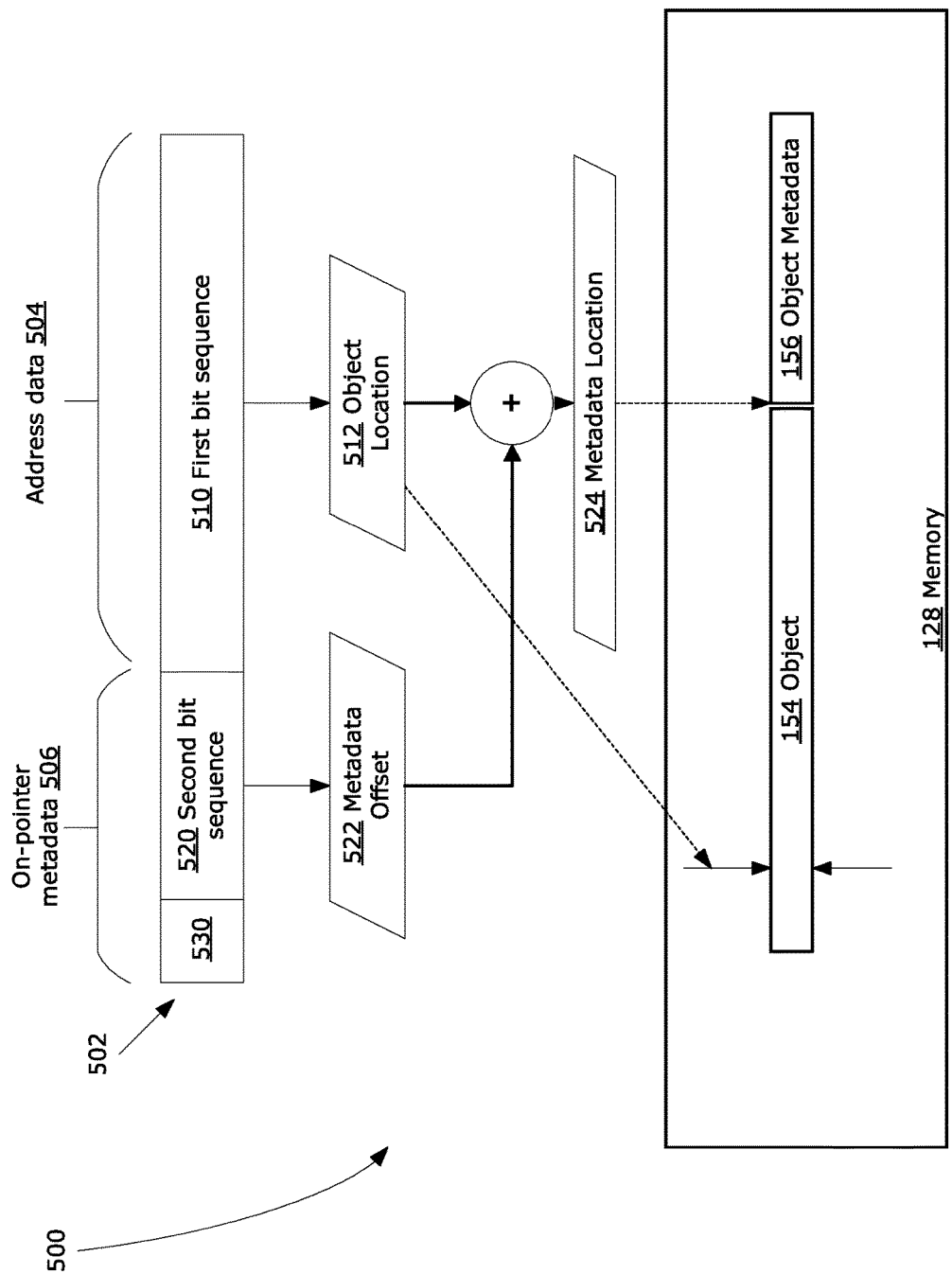
FIG. 5 is a schematic diagram of an object-relative pointer and its associated memory locations, in accordance with examples described herein.

FIG. 5 is a schematic diagram illustrating an Object-relative scheme 500, including an example Object-relative pointer 502 (i.e. a pointer with the object-relative pointer type) and its associated memory spaces. The Object-relative pointer 502 includes a first bit sequence 510 encoding the object location 512 (i.e. the base address in memory 128 of the memory space allocated for the object 154), and a second bit sequence 520 encoding the metadata offset 522. In some embodiments, the first bit sequence 510 is the lower (64-n) bits of a 64-bit pointer used for addressing of the object, and the second bit sequence is the (n-2) available upper bits. A pointer-type bit sequence 530 at the left end of the Object-relative pointer 502 may be used to indicate the pointer type, and therefore the memory allocation scheme, of the Object-relative pointer 502, e.g., 2 bits indicating that the pointer uses the Object-relative scheme 500 and is therefore an object-relative pointer 502.

To compute the metadata location 524, the metadata offset 522 is added to the object location 512, thereby indicating the address of the object metadata 156 in memory 128.

The metadata offset 522 stored on the Object-relative pointer 502 may be represented in some embodiments as a multiple of granules of a power-of-2 size. In some embodiments, it is the natural stack alignment size. Both the object location 512 and metadata location 524 may be aligned at the granule size, with padding inserted if necessary.

In embodiments facing a limit on the bit width of the on-pointer metadata, the Object-relative scheme 500 may not be able to support arbitrarily large objects, as the metadata offset 522 from the object location 512 may exceed the expressible range of the offset. However, implementation can tune the granule size to adjust tradeoff between expressible size range and padding memory wastage. In such embodiments, the maximum metadata offset 522 value defines an object size constraint, which may be detected in some embodiments by application of a size-constraint metric (e.g., a comparison of the size of an object to a maximum metadata offset 522 value). Objects that do not satisfy the size-constraint metric may lead the memory allocator 152 to select a different memory allocation scheme other than the Object-relative scheme 500.

To support the Object-relative scheme 500, when a pointer arithmetic operation is performed (i.e. when the object location 512 of the Object-relative pointer 502 is changed), the device 120 must provide a new instruction to compute the new metadata offset 522 from the new object location 512 to the metadata location 524 and then update the metadata offset 522 stored on the Object-relative pointer 502. This new instruction may be provided as part of the bound checking hardware module 194 in some embodiments. In other embodiments, the re-calculation of the metadata offset 522 may be performed in software, or by a separate hardware module. The compiler 151 must instrument all pointer arithmetic of the software module 140 involving pointers using the Object-relative scheme 500 to use the new instruction.

The Object-relative scheme 500 may exhibit one or more advantages in some embodiments. Metadata setup and cleanup is relatively simple, making it suitable for objects having a short lifetime. There may be few to no constraints on object placement, making it compatible with all program variable types and memory allocators 152. In addition, the Object-relative scheme 500 can potentially handle any number of objects: the Object-relative scheme 500 imposes no constraints on how many objects can be addressed. Furthermore, metadata lookup using the Object-relative scheme 500 may be fast relative to some other schemes.

The Object-relative scheme 500 may therefore be ideal for local variables, which tend to have small sizes and frequent allocation. However, the Object-relative scheme 500 can also be used for other variable types, including global variables and dynamically allocated variables, assuming that the object size constraint is satisfied.

Subheap Memory Allocation Scheme

A second example memory allocation scheme as used by example embodiments described herein is referred to as a Subheap scheme. The Subheap scheme divides the memory 128 into subheaps, each of which contains objects of the same type (objects stored within a subheap may be referred to herein as "subheap objects"). In some embodiments, each subheap is of a power-of-two byte size. A single copy of object metadata is stored at an offset from the subheap base address, and the single copy of the metadata is shared among all objects in that subheap. The size of the subheap and the offset of the object metadata from the subheap location (i.e. the subheap base address) is encoded in the on-pointer metadata. The object location encoded in the pointer address can be considered to constitute two bit sequences: upper bits that correspond to the subheap location, and lower bits that correspond to an object offset from the subheap location to the object location. When the metadata retrieval hardware module 192 reads the on-pointer metadata, it first computes the base address of the subheap by discarding the lower bits of the pointer that correspond to the offset of the object location from the subheap location, then adds the metadata offset to the subheap location to get the metadata location, then reads the metadata from the metadata location.

Figure 6:
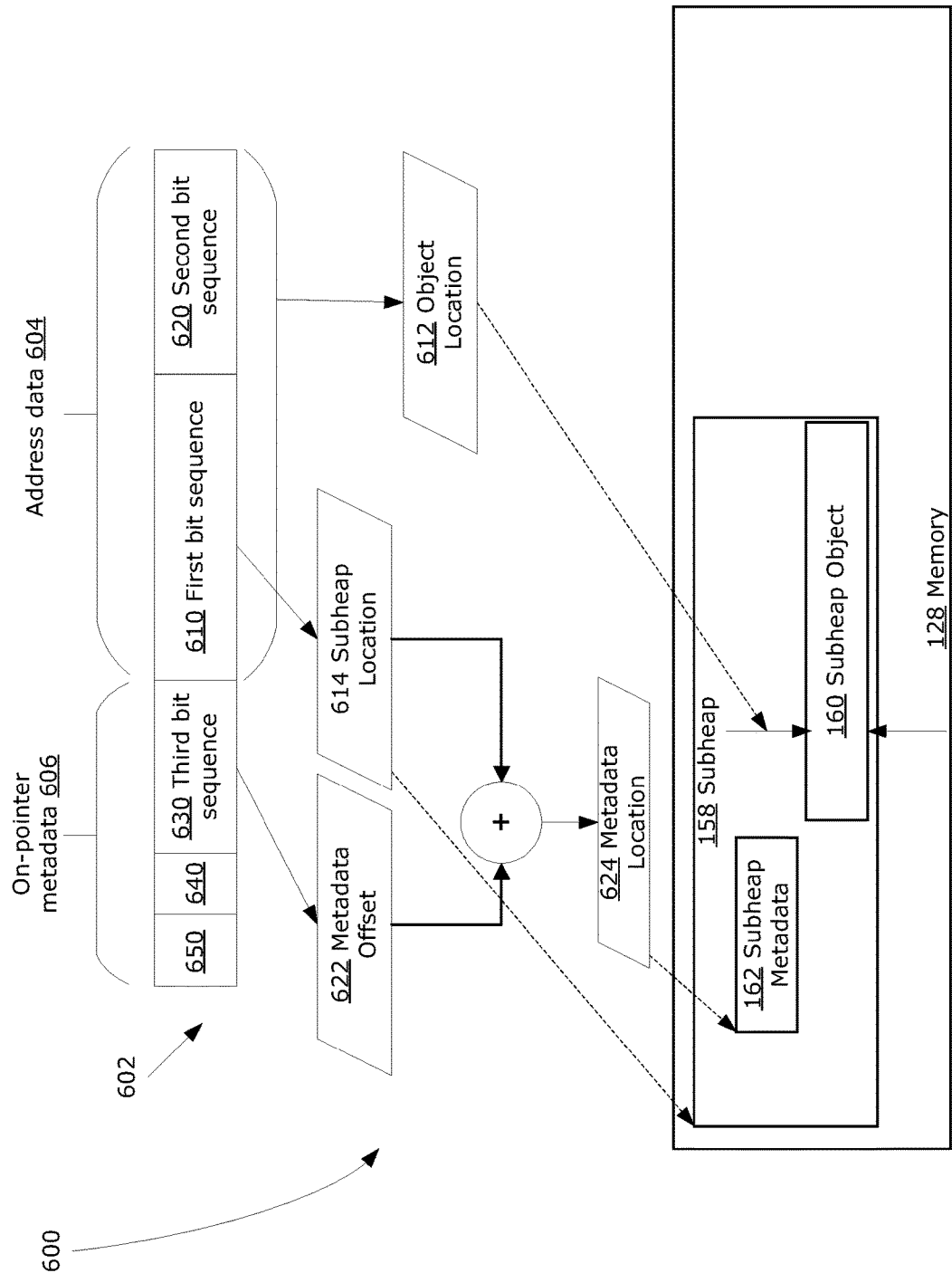
FIG. 6 is a schematic diagram of a subheap pointer and its associated memory locations, in accordance with examples described herein.

FIG. 6 is a schematic diagram illustrating a Subheap scheme 600, including an example Subheap Pointer 602 (i.e. a pointer with the subheap pointer type) and its associated memory spaces. The Subheap Pointer 602 includes a first bit sequence 610 encoding the subheap location 614 (i.e. the base address in memory 128 of the memory space allocated for the subheap 158), a second bit sequence 520 encoding the object location 612 (i.e. the base address in memory 128 of the memory space allocated for the subheap object 160), and a third bit sequence 630 encoding the metadata offset 622. In some embodiments, the first bit sequence 610 and second bit sequence 620 together constitute the lower (64-$n$) bits of a 64-bit pointer used for addressing of the object, and the third bit sequence 630 is the (n-2) available upper bits.

In some embodiments, the third bit sequence 630 does not directly encode the metadata offset 622, or the third bit sequence 630 may be omitted entirely. Instead, the metadata offset 622 may be retrieved or received by the metadata retrieval hardware module 192 from another data source, e.g., one or more control registers of the processor device 125 or a table of entries stored in memory 128. In some embodiments, each subheap 158 uses an identical metadata offset 622 value.

Some embodiments may also indicate a size of the subheap, either by encoding the subheap size in a bit sequence of the on-pointer metadata of the Subheap pointer 602, or by using the metadata retrieval hardware module 192 to retrieve or receive the subheap size from another data source, such as one or more control registers of the processor device 125 or a table of entries stored in memory 128.

To compute the metadata location 624, the metadata offset 622 is added to the subheap location 614, thereby indicating the address of the object metadata (i.e. the single copy of the subheap metadata 162) in the memory 128.

The subheap object 160 stored in the subheap 158 may be located at the object location 612 by reading the first bit sequence 610 and second bit sequence 620 together as a single address, or (equivalently) treating the second bit sequence 620 as encoding an offset to the subheap location 614 encoded by the first bit sequence 610.

As in the Object-relative scheme 500, a pointer-type bit sequence 630 at the left end of the Object-relative pointer 502 may be used in some embodiments to indicate the pointer type, and therefore the memory allocation scheme, of the Subheap Pointer 602, e.g., 2 bits indicating that the pointer uses the Subheap scheme 600 and is therefore a Subheap pointer 602.

In some embodiments, the SubHeap scheme 600 requires a dynamic memory allocator (e.g., memory allocator 152) to group objects of same type into the same subheap, and to properly initialize the shared object metadata (e.g., subheap metadata 162). Therefore, in embodiments that use custom memory allocators, either the existing memory allocators would need to be modified, or a memory allocator 152 should be used that is configured to group objects of same type into the same subheap in keeping with the Subheap scheme 600.

The Subheap scheme 600 may exhibit one or more advantages in some embodiments. In some embodiments, the Subheap scheme 600 can handle objects of arbitrary size. In some embodiments, the Subheap scheme 600 has no per-object overhead, as there is only a single copy of the object metadata stored for an arbitrary number of objects having the same type. Furthermore, metadata lookup using the Subheap scheme 600 may be fast relative to some other schemes.

In some embodiments, the Subheap scheme 600 may impose a constraint on memory allocations. Subheaps 158 used in this scheme may only contain one object type, and the subheap objects 160 can only be allocated in subheaps 158 of their type. This can result in fragmentation on large memory overhead. Thus, in some embodiments the Subheap scheme 600 may be most efficiently used for large objects or for objects that will have memory instances allocated.

Global Table Memory Allocation Scheme

A third example memory allocation scheme as used by example embodiments described herein is referred to as a Global Table scheme. The Global Table scheme stores all object metadata in a single table in memory and uses the on-pointer metadata as an index into the table. When memory space for an object is allocated, an empty row in the table is allocated to store the object metadata, and the row index is embedded in the pointer as on-pointer metadata. The base address of the table may in some embodiments be specified by the environment: in various embodiments, it may be stored in a control register of the processor device 125 or by other means.

Figure 7:
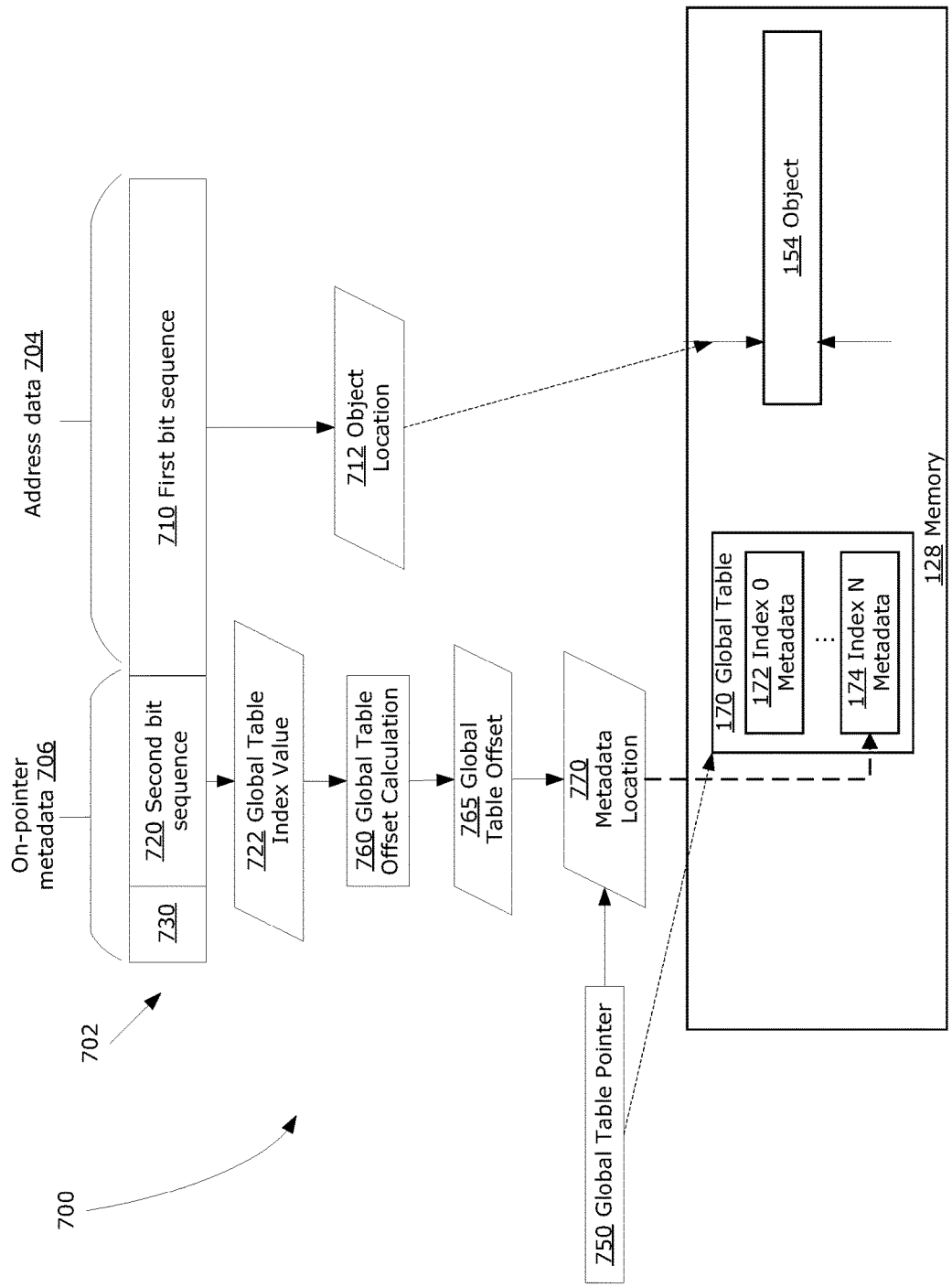
FIG. 7 is a schematic diagram of a global table pointer and its associated memory locations, in accordance with examples described herein.

FIG. 7 is a schematic diagram illustrating a Global Table scheme 700, including an example Global Table Pointer 702 (i.e. a pointer with the global table pointer type) and its associated memory spaces. The Global Table Pointer 702 includes a first bit sequence 710 encoding the object location 712 (i.e. the base address in memory 128 of the memory space allocated for the object 154), and a second bit sequence 720 encoding the global table index value 722 (i.e. an index to the global table 170 stored in memory 128 indicating the indexed location within the global table 170 where the object metadata corresponding to the object 154 is stored). In some embodiments, the first bit sequence 710 is the lower (64-$n$) bits of a 64-bit pointer used for addressing of the object, and the second bit sequence 720 is the (n-2) available upper bits.

To compute the metadata location 770, the global table index value 722 is used (e.g., by a global table offset calculation operation 760 the metadata retrieval hardware module 192) to compute a global table offset 765. In some embodiments, this calculation 760 may be performed as any other table lookup in memory based on a table index value. A global table pointer 750 encoding a base address for the global table 170 is received or retrieved from, e.g., a control register of the processor device 125 as noted above. Using the global table offset 765 and the global table pointer 750, the metadata location 770 may be calculated, thereby indicating the address of the object metadata in the global table 770 in memory 128 (i.e. a location of one of the global table entries "Index Value 0 metadata" 172 through "Index Value N metadata" 174, wherein N-1 is the maximum number of metadata entries that may be stored in the global table 770).

As in the Object-relative scheme 500 and Subheap scheme 600, a pointer-type bit sequence 730 at the left end of the Global Table Pointer 702 may be used in some embodiments to indicate the pointer type, and therefore the memory allocation scheme, of the Subheap Global Table 702, e.g., 2 bits indicating that the pointer uses the Global Table scheme 700 and is therefore a global table pointer 702.

In some embodiments, the Global Table scheme 700 requires a software runtime library 230 or other logic to initialize the global table 770 and set up the metadata table pointer (e.g., at the control register of the processor device 125), and to manage and keep track of available rows in the global table 770.

The Global Table scheme 700 may exhibit one or more advantages in some embodiments. In some embodiments, the Global Table scheme 700 can handle objects of arbitrary size. In some embodiments, the Global Table scheme 700 places no constraints on object placement, as the location of the metadata and the location of the object are unrelated and there is no requirement to locate the object within a subheap of like-typed objects.

In some embodiments, the Global Table scheme 700 may impose a constraint on the number of allocations based on the size of the on-pointer metadata: the number of global table index values 722 that can be encoded in the second bit sequence 720 imposes an upper bound on the number of global table entries (e.g., N-1 in the example shown in FIG. 7). Furthermore, metadata lookup using the Global Table scheme 700 in some embodiments may not exhibit the same speed advantages as some other schemes, such as the Object-relative scheme 500 or the Subheap scheme 600. The Global Table scheme 700 may therefore be used in some embodiments as a fallback scheme when no other schemes are suitable for a given memory allocation.

Method for Flexible, Efficient Hardware-Supported Memory Protection

Figure 8:
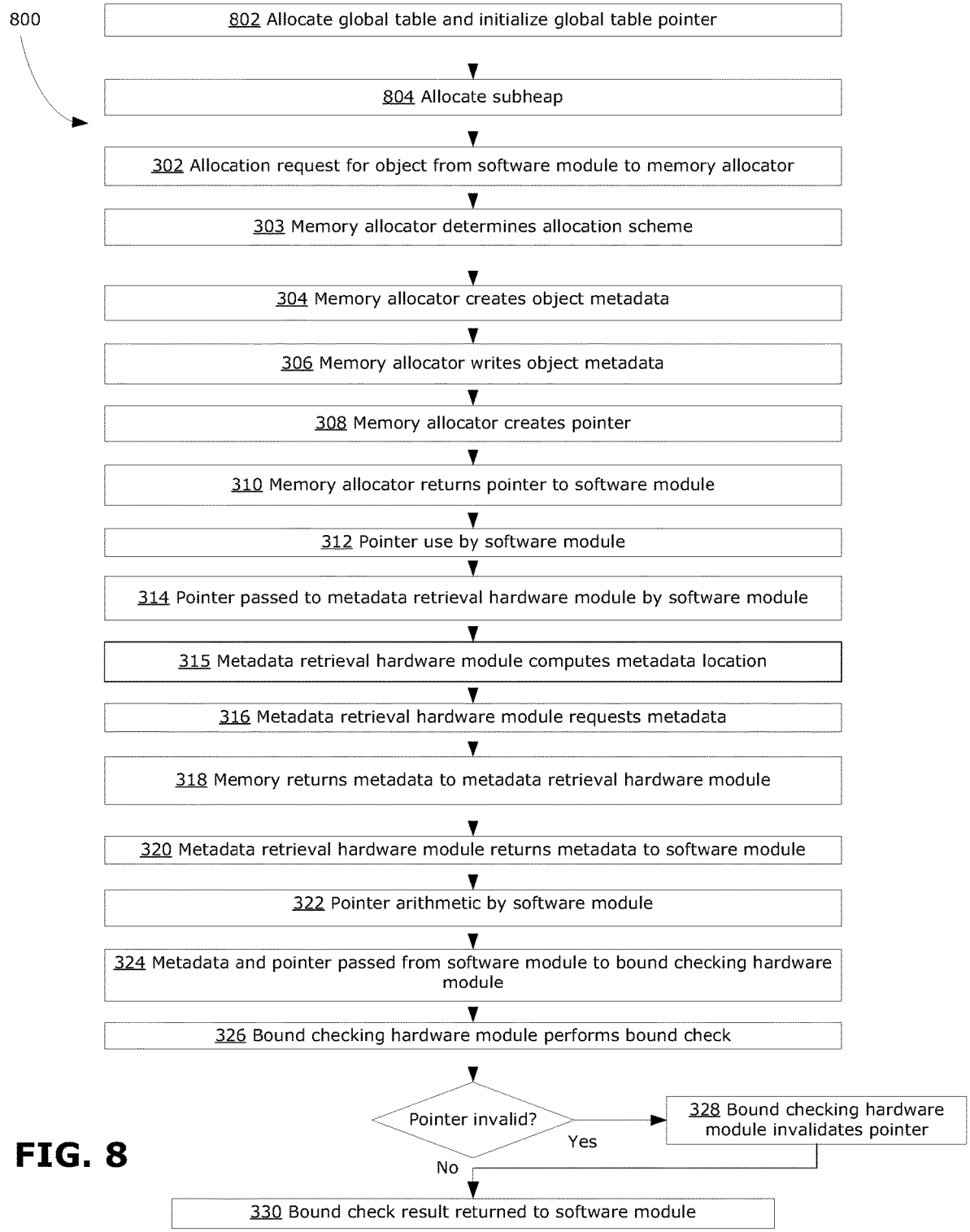
FIG. 8 is a flowchart illustrating the steps of an example method for memory protection configured to use the object-relative memory allocation scheme of FIG. 5, the subheap memory allocation scheme of FIG. 6, and the global table memory allocation scheme of FIG. 7, in accordance with examples described herein.

FIG. 8 is a flowchart illustrating an example method 800 for memory protection configured to use the object-relative memory allocation scheme 500, the subheap memory allocation scheme 600, and the global table memory allocation scheme 700. In some embodiments, method 800 may use a memory allocator 152 programmed to choose between the three memory allocation schemes 500, 600, 700 based on defined criteria, such as characteristics of the object to be stored in memory and the constraints of the device 120, system or environment in which the memory allocation is taking place.

At 802, the memory allocator 152 allocates the global table 770 and defines the global table pointer 750 as described above with reference to FIG. 7. In some embodiments, as noted above, the initialization of the global table pointer 750 in a control register of the processor device 125 and the management and tracking of empty global table entries may be managed by a runtime library 230 linked against the software module 140.

At 804, the memory allocator 152 allocates a subheap 158 in memory 128 as described above with reference to FIG. 6. This step 802 may also allocate and populate the subheap metadata 162 for the allocated subheap 158. In some embodiments, each subheap 158 may be created on-demand, such as in response to a memory allocation request at step 302. However, once a subheap 158 has been created for a given object type, further memory allocation requests to allocate memory for objects of the same type may allocate memory for the new object in an existing subheap 158 of the correct type.

The method 800 then proceeds to carry out various steps of method 300 described above with reference to FIG. 3, specifically steps 302, 303, 304, 306, optionally 307, 308, 310, 312, 314, 315, 316, 318, 320, 322, 324, 326, 328 (if the pointer is determined to be invalid), and 330.

In method 800, several of these steps may be configured to make use of the three example memory allocation schemes 500, 600, 700 described above. At step 303, the memory allocator 152 may select among multiple memory allocation schemes by applying various criteria, such as the memory allocation scheme selection sub-steps described below with reference to FIG. 9. At step 304, the object metadata may be created in accordance with the memory allocation scheme selected at step 303, e.g., scheme 500, 600, or 700. At step 306, the object metadata may be written to the metadata location as calculated under the selected memory allocation scheme. Depending on the memory allocation scheme selected at step 303, the pointer created at 308 and returned at 310 may be an Object-relative pointer 502, a Subheap Pointer 602, a Global Table pointer 702, or another pointer type.

At 315, the computation of the metadata location may be carried out based on the scheme of the pointer, as described above with reference to schemes 500, 600, and 700. In some embodiments, the metadata retrieval hardware module 192 may first use the pointer-type bit sequence 530, 630, 730 of the pointer to determine which scheme 500, 600, or 700 applies to the pointer before calculating the metadata location from the other bit sequences stored on the pointer according to the techniques described for the corresponding scheme 500, 600, or 700.

Figure 9:
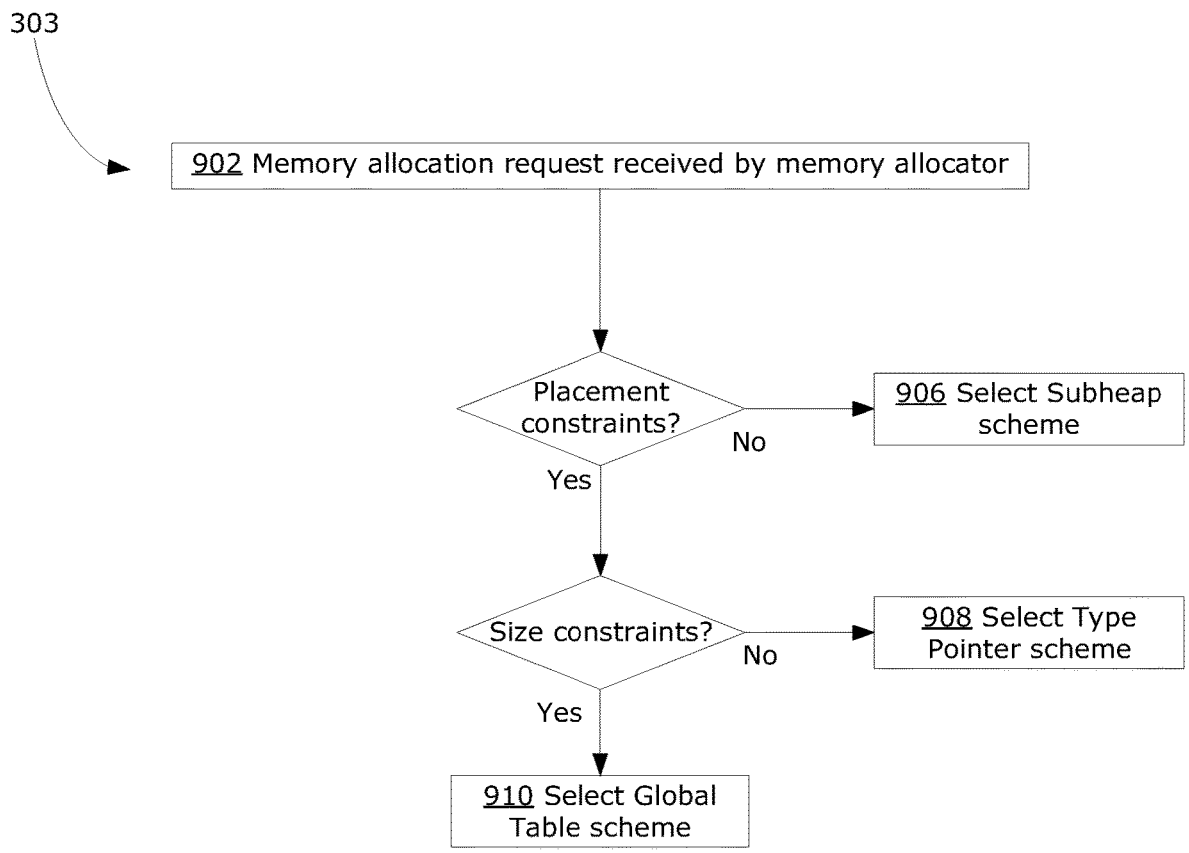
FIG. 9 is a flowchart illustrating sub-steps of the memory allocation scheme selection step the flowchart of FIG. 8.

FIG. 9 is a flowchart illustrating sub-steps of the memory allocation scheme selection step 303 of method 800. It will be appreciated that the sub-steps shown in FIG. 9 could be replaced by other steps, or apply other metrics or criteria for selecting a memory allocation scheme, in different embodiments.

At 902, the memory allocator 152 receives the request from the software module 140 to allocate a memory space for a data object. In some embodiments, the software module 140 may include legacy code that uses a conventional or legacy memory allocation scheme other than the memory-protected schemes 500, 600, 700 described herein. Pointers used by such legacy code may be generated by a legacy memory allocator (not shown) instead of memory allocator 152. The decision to send a memory allocation request to the legacy memory allocator may be made in some embodiments based on the nature or format of the memory allocation request sent by the software module 140, or may be made within the software module 140. In some embodiments, a pointer-type bit sequence of the on-pointer metadata of a legacy pointer may indicate that it is of a legacy pointer type. Some legacy memory allocation schemes may not use object metadata for memory protection as described herein. The compiler 151 may in some embodiments modify the allocation call to invoke the memory allocator 152 instead of the legacy memory allocator; because legacy code has not been compiled using the compiler 151, the memory allocation calls in such legacy code are directed to the legacy memory allocator instead.

In response to receiving the memory allocation request, the memory allocator 152 next applies a placement-constraint metric to determine whether the data object faces placement constraints in the context of the device 120, memory 128, or environment in which the memory allocator 152 is operating. If the placement-constraint metric is satisfied (i.e. if there is no placement constraint applicable to the data object), then the memory allocator 152 selects the Subheap scheme 600 at step 906. Examples of placement constraints in some embodiments include a requirement to allocate the object on the stack instead of the heap (e.g., for local variables), or a requirement to allocate the object in the data segment instead of the heap (e.g., for global variables).

If the placement-constraint metric is not satisfied, the memory allocator 152 next applies a size-constraint metric to determine whether the data object is too large to use the Object-relative scheme 500. If the size-constraint metric is satisfied, then the memory allocator 152 selects the Object-relative scheme 500 at step 908.

If the size-constraint metric is not satisfied, the memory allocator 152 selects the Global Table scheme 700.

While the memory allocation steps of methods 300, 400, and 800 described above are described as being performed by the memory allocator 152, in some embodiments global and/or local variables will be allocated using the same steps (and sub-steps 902, 906, 908, 910), performed by one or more software and/or hardware units other than the memory allocator 152. For example, global variables may be allocated in the data segment by the linker 153 at linking time (e.g., at or after step 210 of method 200). The global variable's base address (i.e. object location) is then fixed, and the metadata for the global variable is initialized at runtime. For local variables, the compiler 151 may issue instructions to allocate the local variable on the memory stack. In these two cases, the memory allocator 152 may not be invoked for memory allocation, and may instead be used only to allocate heap variables (i.e. the memory allocator 152 is a heap memory allocator). Furthermore, in some embodiments the compiler 151 may add code at compile time (e.g., at step 204 or 206 of method 200) that pre-determines which memory allocation scheme should be applied by the linker 153 or memory allocator 152 to the variable.

Internal Fat-Pointer Implementation using a Memory-Safe Processor Device

A detailed example implementation of the methods and hardware modules described above will now be described with reference to FIG. 10. The example implementation is referred to as an "Internal Fat Pointer" (IFP) implementation due to its internal use of fat 256-bit pointers to supplement the contents of a standard 64-bit pointer with additional metadata used for memory safety.

The IFP implementation preserves a 64-bit pointer size for all programmer-facing logic by making sure that the pointers are 64 bits when stored in memory that programmers can manage (e.g., heap allocated variables and global variables). However, when a function loads a pointer from these vulnerable programmer-managed memory locations (i.e. locations vulnerable to memory exploits) and the pointer is going to be used, the additional code instrumented by the compiler converts the 64 bit pointer to a 256-bit fat pointer using a promotion instruction ("promote"). The additional code instrumented by the compiler then issues a further instruction to perform a fused pointer arithmetic and bound check step. When the pointer is going to be saved back to the vulnerable programmer-managed memory, the additional code instrumented by the compiler issues a further instruction to demote the pointer back to 64 bits.

Two concepts are referred to in the description of the IFP implementation herein:

1. Pointer bound or bound of a pointer: this concept refers to an address pair [lower bound, upper bound] describing the address range within which a valid pointer must point.

2. Keyed hash or message authentication code (MAC): Given a secret key K and a message M, a keyed hash H(K,M) has the property that for any K' not identical to K, and/or for any M' not identical to M, H(K', M') is highly unlikely to be identical to H(K, M). This means that the IFP can put K inside a control register that attackers cannot access, thereby ensuring the integrity and authenticity of metadata M by placing a keyed hash H(K, M) beside the metadata during initialization and verifying the keyed hash during metadata load, as described below.

Figure 10:
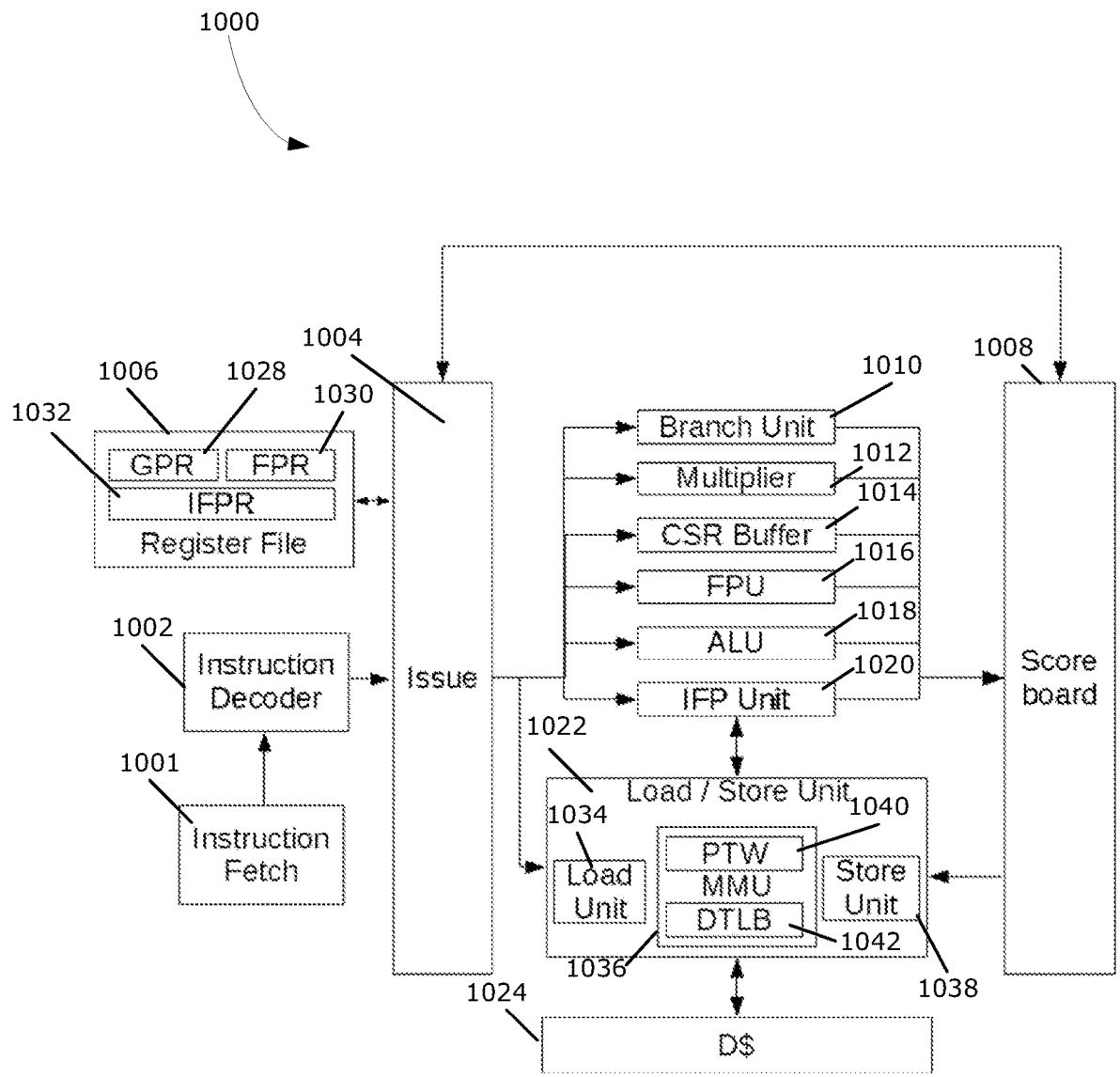
FIG. 10 is a block diagram of a first example processor core implementing a metadata retrieval hardware module and a bound checking hardware module in accordance with examples described herein.

FIG. 10 is a block diagram showing an example memory-safe processor core 1000 including hardware components that implement the features of the metadata retrieval hardware unit 192 and bound checking hardware module 194. In particular, the memory-safe processor core 1000 includes a set of internal fat pointer registers (IFPR) 1032 within the register file 1006 and an internal fat pointer (IFP) unit 1020 as a new execution unit in the processor core's execution engine that can initiate memory reads to the load-store unit 1022 to implement the promotion instruction described above. Furthermore, the instruction decoder 1002, scoreboard 1008, arithmetic logic unit (ALU) 1018, load unit 1034, and store unit 1038 are modified to implement the memory safety features described above.

As to its general structure, the memory-safe processor core 1000 includes standard components of a processor core: an instruction fetch block 1001 for fetching instructions; an instruction decoder stage 1002 for decoding instructions; an issue 1004 for issuing decoded instructions; a register file 1006 including a set of general purpose registers (GPR) 1028 and a set of floating-point registers (FPR) 1030; a scoreboard 1008 for scheduling pipelines; several execution units in the execution engine, including a branch unit 1010, a multiplier 1012, a control and status register (CSR) buffer 1014, a floating point unit (FPU) 1016, and an ALU 1018; a load-store unit 1022 including a load unit 1034, store unit 1038, and a memory management unit (MMU) 1036 including a page table walker (PTW) 1040 and a data translation lookaside buffer (DTLB) 1042; and a data cache (D$) 1024. As noted above, the instruction decoder 1002, scoreboard 1008, arithmetic logic unit (ALU) 1018, load unit 1034, and store unit 1038 are configured to implement the features described herein, and the IFP unit 1020 and IFPR 1032 have been added. A modified Ariane processor may be used for the memory-safe processor core 1000, based on a RISC-V instruction set.

The 64-bit pointers used by the IFP implementation are structured as follows:

1. The lower 48 bits ([47:0]) are address data.

2. The top 2 bits ([63:62]) are poison bits used to mark a pointer as invalid, e.g., at pointer invalidation step 328 of method 300. One bit is persistent: once set, this pointer can no longer be valid. The other bit is temporary or spatial: it is set when the pointer is brought out of bound (e.g., at pointer invalidation step 328), but it is cleared when the pointer is brought in bound again (e.g., by pointer arithmetic step 322). The processor 1000 is configured to trap or halt the memory access if either of the poison bits is set on the pointer operand.

3. The next two highest bits ([61:60]) represent the metadata scheme, i.e. they are the pointer-type bit sequence. If the pointer is raw (i.e. no scheme, or a legacy pointer type), these two bits are zero.

4. The remaining bits are scheme-dependent metadata, i.e. the other on-pointer metadata.

The 256-bit fat pointers used by the IFP implementation are structured as follows:

1. The lower 64 bits ([63:0]) are identical to a normal sized 64-bit pointer as described above.

2. The upper 128 bits ([255:128]) are for the pointer bound

3. The remaining bits ([127:0]) may be used for other purposes.

The new core instructions used by the memory-safe processor core 1000 in the IFP implementation are as follows:

1. promote: Receiving a 64-bit pointer and a minimum underlying type size (e.g., 4 for type int and 8 for type double), the promote instruction generates a 256-bit fat pointer representation of the received 64-bit pointer. It also sets the corresponding poison bits of the 256-bit fat pointer if it is invalid, e.g., out of bound.
   a. The IFP unit 1020 is in communication with the load-store unit 1022 to initiate memory reads to implement the promotion instruction.
   b. The IFP unit 1020 implements the promote instruction by retrieving the object metadata corresponding to the received 64-bit pointer address data and using it to compute the pointer bound according to one of the schemes described herein (e.g., object-relative, sub-heap, or global table). The pointer bound can then be encoded into the fat pointer representation of the received 64-bit pointer.
2. size check: Receiving a 256-bit fat pointer (encoding address in the address data) and a 64-bit size value, this instruction checks if all bytes in range [address, address+size] are in the pointer bound. If they are not, the instruction sets the persistent poison bit on the fat pointer.
3. pointer add: Receiving a 256-bit fat pointer (encoding address in the address data) and a 64-bit offset value, this instruction adds the offset to the address and sets the temporary poison bit if the resulting address (i.e. the pointer arithmetic result) is out of the pointer bound.
4. demote: This instruction receives a 256-bit fat pointer and extracts the 64-bit pointer from the received 256-bit fat pointer. It can optionally be fused with a size check instruction.

The IFP unit 1020 implements the promote instruction by retrieving object metadata for a received 64-bit pointer and adding the retrieved metadata to a fat 256-bit pointer representation of the received 64-bit pointer before returning the fat 256-bit pointer to the calling software module. Thus, the IFP unit 1020 effectively acts as the metadata retrieval hardware module 192 in this embodiment.

The modifications to the ALU 1018 implement the size check, pointer add, and demote instructions described above, thereby enabling some of the bound checking steps 326, 328, 330 described above with reference to method 300. Thus, the bound checking hardware module 194 may be considered to include the modified ALU 1018, although, as described below, other components of the memory-safe processor core 1000 may also carry out various operations of the bound checking hardware module 194, and may therefore be considered to be included therein.

It will be appreciated that, in addition to the four core instructions described above, the IFP implementation may include additional instructions for carrying out various memory safety, metadata retrieval, and bound checking operations as describe above with reference to the example methods. These instructions may in some embodiments be implemented in software (e.g., the code instrumented into the software module 140), or they may be included as hardware instructions of the processor core 1000 to realize greater speed and optimization. These instructions may include instructions for: loading and/or storing the 256-bit values (so that registers can be spilled to stack slots in case they are depleted), computing the keyed hash, setting and/or removing on-pointer metadata, constructing a 256-bits pointer without using promote, and other miscellaneous instructions (e.g., for debugging).

Figure 11:
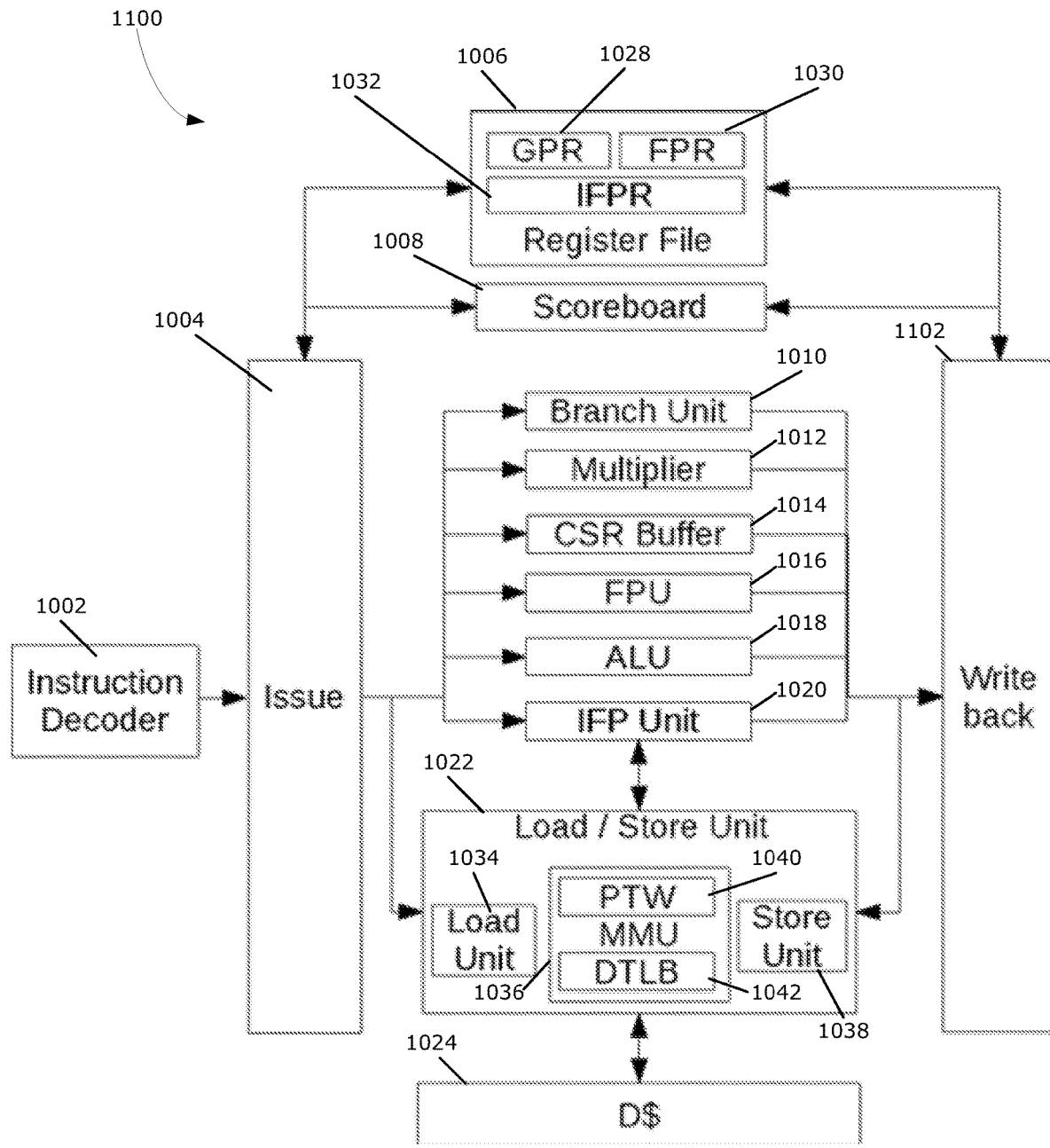
FIG. 11 is a block diagram of a second example processor core as an alternative to the processor core of FIG. 10.

As noted above, several modifications are made to the Ariane processor core. The new register file IFPR 1032 holds 256-bits pointers. The data path is widened relative to a conventional 64-bit processor in order to move 256-bit value between components and to load and store 256-bit fat pointers. The instruction decoder stage 1002 is modified so that new instructions promote, size check, pointer add, and demote are recognized. Different baseline processor architectures may require different modifications. FIG. 11 shows an alternative architecture for a memory-safe processor core 1100 used in the IFP implementation, further including a write back unit 1102 for write-back caching but not showing the instruction fetch block 1001. It will be appreciated that the alternative processor core 1100 may be used to perform the operations described above in relation to the first example processor core 1000.

The compiler 151 used in the IFP implementation is used to perform the following functions:
1. Instrument a promotion instruction in the instrumented object code when a pointer from an unknown source (i.e., the compiler 151 is not sure which object it would point to) is used for arithmetic or dereferenced
2. Replace conventional pointer arithmetic code with the new instructions size check and pointer add.
3. Instrument a demotion instruction when a 64-bit pointer is expected, e.g., when returning a value, storing to memory, etc.
4. Perform escape analysis. The compiler 151 finds all object memory allocations that have any derived pointers that have escaped (i.e., pointers that may later be promoted). The compiler 151 then instruments each such allocation to use one of the schemes described herein, and replace the pointer with a corresponding pointer type having on-pointer metadata.

The linker 153 does not need to be modified. However, a runtime library 230 is used to perform various functions as described herein, and a command line argument is injected to link in the necessary runtime library 230 when linking (e.g., at step 212).

Whenever a pointer is promoted, if the persistent poison bit is set, or the pointer is not using any scheme (e.g., it is a legacy pointer), the metadata retrieval steps are bypassed. Thus, raw or legacy pointers effectively have infinite bound. In order to accommodate off-by-1 pointers using one of the schemes described herein (i.e. pointers pointing to the end of an object), if the pointer has the temporary poison bit set, the promote logic treats the pointer as if it has an encoded address value of (address-1) during metadata retrieval, wherein address is the actual current value of the address encoded in the address data.

Global Table scheme

A Global Table scheme 700 is implemented as described above. A control register stores a pointer to a base address of the global table 770 in memory. The global table 770 directly stores the object metadata, which consists of a pointer bound (i.e. the absolute address) and a type metadata word, for objects stored in the global table 770. The runtime library 230 contains code to manage the global table 770.

Object-Relative scheme

An object-relative scheme 500 is implemented as described above. During allocation, each object 154 using the object-relative scheme 500 is at least 16-byte aligned, and is appended with 16 bytes (128 bits) of object metadata 156 in a metadata location 524 at the end of the memory space allocated for the object 154. The 128 bits of stored object metadata 156 are structured as follows:
1. The lower 64 bits ([63:0]) encode the type metadata word indicating the object type.
2. The next lower 48 bits ([111:64]) encode a keyed hash.
3. The next 12 bits ([123:112]) encode the object size.

4. The upper 4 bits ([128:124]) are a pointer-type bit sequence indicating this metadata is for use by the object-relative scheme 500.

In an object-relative pointer 502, 6 bits of on-pointer metadata is used to represent the metadata offset 522. During promote:
1. The object metadata location 524 is calculated as (address−(address modulo 16)+(metadata offset*16)), due to the 16-byte alignment of the object 154.
2. The object metadata 156 is loaded from memory.
3. The keyed hash stored alongside the metadata is verified in parallel with the above metadata load step.
4. If the object size is a multiple of 16:
   a. The upper bound is set equal to the metadata location 524 (i.e. the object metadata base address).
   b. The lower bound is set equal to the metadata location 524 minus the object size.
5. If the object size is not a multiple of 16:
   a. The lower bound is set equal to the metadata location 524 minus (object size+16−(object size modulo 16)).
   b. The upper bound is set equal to the lower bound plus the object size.

The keyed hash is computed using a new instruction. The key is in a control register initialized by the runtime library 230.

Subheap scheme

A subheap scheme 600 is implemented as described above. 4 bits of on-pointer metadata is the "configuration index". 16 control registers encoding the values subheap size and metadata offset (i.e. metadata offset 622) are added to instruction set, and they are initialized by the runtime library 230. Each subheap 158 using the same configuration has an identical size and metadata offset 622. The memory inside the subheap 158 is modeled as follows: each subheap contains an allocation array where all subheap objects 160 are allocated. The allocation array may not extend the entire size of the subheap 158; a start offset and an end offset mark the bound of the allocation array relative to the subheap location 614. Each subheap object 160 occupies an allocation slot in the allocation array, wherein the base address of the subheap object 160 is also the base address of the allocation slot. The size of an allocation slot is constrained to be relatively easy for hardware to perform division upon: the allocation array may accept slot sizes in form of, e.g., $2^N$ or $(3 \times 2^{(N)})$. The subheap metadata 162 is 32 bytes (256 bits) in size and includes the following metadata:
1. The allocation array start offset;
2. The allocation array end offset;
3. The slot size (constrained as described above) and object size;
4. The type metadata word; and
5. The keyed hash.

While executing the promote instruction, while or after the metadata is loaded, the memory-safe processor core 1000 performs the following steps:
1. Verify the keyed hash in parallel with the metadata load.
2. Check if address encoded in the pointer address data is within the allocation array.
3. Compute the allocation slot base address as: address−((address−allocation array start address) modulo (slot size)). (The allocation array start address is, e.g., the subheap base address+the allocation array start offset)
4. Set the lower bound equal to the allocation slot base address.
5. Set the upper bound equal to the lower bound plus the object size.

It will be appreciated that different numbers and different bit structures may be used in other embodiments or implementations. The memory-safe processor core 1000 and IFP implementation described above is merely provided as a single detailed example usable as part of an example embodiment of a device or method for metadata retrieval as described herein.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:
1. A device, comprising:
   a metadata retrieval hardware module;
   a processor device; and
   a memory containing instructions that, when executed by the processor device, operate a software module to provide a pointer to the metadata retrieval hardware module, the pointer comprising:
      address data encoding an object location, the object location indicating a location within an object stored in the memory; and
      on-pointer metadata;
   the metadata retrieval hardware module being configured to:
      use the on-pointer metadata to identify a pointer type of the pointer from a plurality of pointer types, the plurality of pointer types comprising:

an object-relative pointer type; and
a second pointer type;
calculate the metadata location of a pointer of the object-relative pointer type by:
  decoding a metadata offset from the on-pointer metadata of the pointer; and
  adding the metadata offset to the object location to calculate the metadata location;
calculate the metadata location of a pointer of the second pointer type by:
  determining a base location different from the object location; and
  adding an offset amount, calculated based on the on-pointer metadata, to the base location to calculate the metadata location;
retrieve object metadata from the metadata location; and
provide the object metadata to the software module.

2. The device of claim 1, wherein the metadata retrieval hardware module comprises a module of the processor device in communication with a load-store unit of the processor device.

3. The device of claim 1, further comprising a bound checking hardware module, wherein:
the instructions, when executed by the processor device, further operate the software module to provide the pointer and the memory object metadata to the bound checking hardware module; and
the bound checking hardware module is configured to:
  perform a memory bound check based on the pointer and the memory object metadata, thereby generating a bound check result; and
  return the bound check result to the software module.

4. The device of claim 3, wherein the bound checking hardware module is further configured to invalidate the pointer in response to generating an out-of-bounds bound check result.

5. The device of claim 3, wherein the bound checking hardware module comprises a module of the processor device in communication with a load-store unit of the processor device.

6. The device of claim 1, wherein the metadata retrieval hardware module is further configured to calculate the metadata location of a pointer of the object-relative pointer type by:
determining the object location by decoding a first bit sequence of the address data;
determining the metadata offset by decoding a second bit sequence of the on-pointer metadata; and
adding the metadata offset to the object location to calculate the metadata location.

7. The device of claim 6, wherein the instructions, when executed by the processor device, further cause the device to:
identify a data object as failing to satisfy a placement-constraint metric and satisfying a size-constraint metric;
allocate an object memory space for storing the data object in the memory, the object memory space being located at an object base address;
allocate a metadata memory space for storing the memory object metadata in the memory, the metadata memory space being located at the metadata location; and
generate the pointer by:
  setting the object location to the value of the object base address; and
  setting the metadata offset to a difference between the metadata location and the object location.

8. The device of claim 1, wherein:
the second pointer type is a subheap pointer type;
the metadata retrieval hardware module is configured to calculate the metadata location of a pointer of the subheap pointer type by:
  determining the base location by decoding a first bit sequence of the address data, the base location comprising a subheap location;
  determining the offset amount, the offset amount comprising a metadata offset; and
  adding the subheap metadata offset to the subheap location to calculate the metadata location.

9. The device of claim 8, wherein the instructions, when executed by the processor device, further cause the device to:
allocate a subheap in the memory located at the subheap location;
store the object metadata within the subheap at the metadata location, the object metadata comprising object type metadata indicating an object type for objects stored in the subheap;
identify a data object as being of the object type and satisfying a placement-constraint metric;
allocate an object memory space for storing the data object, the object memory space being located at an object base address within the subheap, the object base address being offset from the subheap location by the object offset; and
generate the pointer by:
  encoding the subheap location as a first bit sequence of the address data;
  setting an object offset to a difference between the object base address and the subheap location; and
  encoding the object offset as a second bit sequence of the address data.

10. The device of claim 1, wherein:
the second pointer type is a global table pointer type;
the metadata retrieval hardware module is configured to calculate the metadata location of a pointer of the global table pointer type by:
  determining the offset amount by:
    decoding a second bit sequence of the on-pointer metadata encoding a global table index value; and
    calculating the offset amount based on the global table index value, the offset amount comprising a global table offset amount;
  retrieving the base location, the base location comprising a global table base location; and
  adding the global table offset amount to the global table base location to calculate the metadata location.

11. The device of claim 10, wherein the instructions, when executed by the processor device, further cause the device to:
identify a data object as failing to satisfy a placement-constraint metric and failing to satisfy a size-constraint metric;
allocate an object memory space for storing the data object in the memory, the object memory space being located at an object base address;
allocate a metadata memory space for storing the object metadata in the memory, the metadata memory space being located at the metadata location;
store the object metadata within the global table at the metadata location; and
generate the pointer by:

setting the object location to the value of the object base address; and setting the global table index value to a value corresponding to the global table offset amount.

12. The device of claim 1, wherein:

the second pointer type is a subheap pointer type;

the plurality of pointer types further comprises a global table pointer type;

the metadata retrieval hardware module is configured to:

calculate the metadata location of a pointer of the object-relative pointer type by:

determining the object location by decoding a first bit sequence of the address data;

determining the metadata offset by decoding a second bit sequence of the on-pointer metadata; and adding the metadata offset to the object location to calculate the metadata location;

calculate the metadata location of a pointer of the subheap pointer type by:

determining the base location by decoding a first bit sequence of the address data, the base location comprising a subheap location;

determining the offset amount by decoding a third bit sequence of the on-pointer metadata, the offset amount comprising a metadata offset; and adding the metadata offset to the subheap location to calculate the metadata location; and calculate the metadata location of a pointer of the global table pointer type by:

determining the offset amount by:

decoding a second bit sequence of the on-pointer metadata encoding a global table index value; and calculating the offset amount based on the global table index value, the offset amount comprising a global table offset amount;

retrieving the base location, the base location comprising a global table base location; and adding the global table offset amount to the global table base location to calculate the metadata location.

13. A method comprising:

using a software module to provide a pointer to a metadata retrieval hardware module, the pointer comprising:

address data encoding an object location, the object location indicating a location within an object stored in a memory; and on-pointer metadata;

using the metadata retrieval hardware module to:

use the on-pointer metadata to identify a pointer type of the pointer from a plurality of pointer types, the plurality of pointer types comprising:

an object-relative pointer type wherein:

the on-pointer metadata encodes a metadata offset; and a metadata location is offset from the object location by the metadata offset; and a second pointer type wherein a metadata location is offset from a base location by an offset amount calculated based on the on-pointer metadata; and calculate the metadata location based at least in part on the pointer type of the pointer;

retrieve object metadata from the metadata location; and provide the object metadata to the software module.

14. The method of claim 13, further comprising:

using the software module to provide the pointer and the memory object metadata to a bound checking hardware module;

using the bound checking hardware module to:

perform a memory bound check based on the pointer and the memory object metadata, thereby generating a bound check result; and return the bound check result to the software module.

15. The method of claim 14, further comprising:

using the bound checking hardware module to invalidate the pointer in response to generating an out-of-bounds bound check result.

16. The method of claim 15, further comprising:

using a compiler to compile source code to generate the software module, wherein the steps of providing the pointer to the metadata retrieval hardware module and providing the pointer and the memory object metadata to the bound checking hardware module are performed by instrumentation code added to the software module by the compiler.

17. The method of claim 13, wherein:

the pointer is of the object-relative pointer type;

the object location is encoded in the address data as a first bit sequence;

the on-pointer metadata comprises a second bit sequence encoding the metadata offset; and the step of identifying the metadata location in the memory based on the pointer type comprises adding the metadata offset to the object location to identify the metadata location.

18. The method of claim 13, wherein:

the pointer type is the second pointer type;

the second pointer type is an object-relative pointer type;

the base location comprises a subheap location encoded in the address data as a first bit sequence;

an object offset is encoded in the address data as a second bit sequence;

the offset amount comprises a metadata offset; and the step of identifying the metadata location in the memory based on the pointer type comprises adding the metadata offset to the subheap location to identify the metadata location.

19. The method of claim 13, wherein:

the pointer type is the second pointer type;

the second pointer type is a global table pointer type;

the base location comprises a global table base location;

the offset amount comprises a global table offset amount;

the object location is encoded in the address data as a first bit sequence;

a global table index value is encoded in the on-pointer metadata as a second bit sequence; and the step of identifying the metadata location in the memory based on the pointer type comprises:

retrieving the global table base location;

calculating the global table offset amount based on the global table index value; and adding the global table offset amount to the global table base location to identify the metadata location.

20. A non-transitory processor-readable medium containing instructions for operating the device of claim 3.

* * * * *